United States Patent
Park

(10) Patent No.: US 9,179,458 B2
(45) Date of Patent: Nov. 3, 2015

(54) METHOD FOR ALLOCATING RESOURCES FOR HARQ ACK/NACK SIGNAL TRANSMISSION, AND METHOD AND APPARATUS FOR HARQ ACK/NACK SIGNAL TRANSMISSION USING SAME

(75) Inventor: Dong Hyun Park, Seoul (KR)

(73) Assignee: Pantech Co., Ltd., Seoul (KR)

( * ) Notice: Subject to any disclaimer, the term of this patent is extended or adjusted under 35 U.S.C. 154(b) by 158 days.

(21) Appl. No.: 13/980,483

(22) PCT Filed: Jan. 17, 2012

(86) PCT No.: PCT/KR2012/000377
§ 371 (c)(1),
(2), (4) Date: Jul. 18, 2013

(87) PCT Pub. No.: WO2012/099368
PCT Pub. Date: Jul. 26, 2012

(65) Prior Publication Data
US 2013/0301600 A1 Nov. 14, 2013

(30) Foreign Application Priority Data
Jan. 19, 2011 (KR) .................. 10-2011-0005637

(51) Int. Cl.
*H04W 4/00* (2009.01)
*H04W 72/04* (2009.01)
*H04L 1/18* (2006.01)

(52) U.S. Cl.
CPC ........... *H04W 72/042* (2013.01); *H04L 1/1861* (2013.01); *H04L 1/1896* (2013.01)

(58) Field of Classification Search
CPC .. H04W 72/042; H04L 1/1861; H04L 1/1896
See application file for complete search history.

(56) References Cited

U.S. PATENT DOCUMENTS

| 8,861,530 | B2* | 10/2014 | Han et al. ...................... 370/394 |
| 2009/0274109 | A1 | 11/2009 | Zhang et al. |
| 2012/0155337 | A1* | 6/2012 | Park .............................. 370/280 |
| 2013/0022011 | A1* | 1/2013 | Enomoto et al. .............. 370/329 |
| 2013/0242890 | A1* | 9/2013 | He et al. ........................ 370/329 |
| 2013/0301600 | A1* | 11/2013 | Park .............................. 370/329 |
| 2014/0092856 | A1* | 4/2014 | Yang et al. .................... 370/329 |
| 2014/0153532 | A1* | 6/2014 | Nogami et al. ............... 370/329 |
| 2014/0286292 | A1* | 9/2014 | Park .............................. 370/329 |

OTHER PUBLICATIONS

International Search Report issued on Sep. 27, 2012 in International Application No. PCT/KR2012/000377.
Samsung, 3GPP TSG RAN WG1 #62bis, R1-105359, "HARQ-ACK Resource Indication in PUCCH for DL CA," Oct. 11-15, 2010, Xian, China.
Qualcomm Incorporated, 3GPP TSG RAN WG1 #62bis, R1-105557, "PUCCH resources for multi-bit ACK," Oct. 11-15, 2010, Xi'an, China.

* cited by examiner

*Primary Examiner* — Robert Wilson
(74) *Attorney, Agent, or Firm* — H.C. Park & Associates, PLC

(57) ABSTRACT

The present invention relates to a method for allocating PUCCH resources for an HARQ ACK/NACK signal, and to a method for HARQ ACK/NACK signal transmission using same. The method for allocating PUCCH resources for an HARQ ACK/NACK signal comprises the following steps: constructing an ACK/NACK resource indicator (ARI) mapping table based on the HARQ ACK/NACK signal transmission method of a terminal; transmitting the ARI mapping table to the terminal via upper layer signaling; constructing an ARI indicating PUCCH resources to be allocated to the terminal on the ARI mapping table; and transmitting the ARI to the terminal. The ARI mapping table may be transmitted to a plurality of terminals and shared among the plurality of terminals and a base station.

18 Claims, 11 Drawing Sheets

METHOD FOR ALLOCATING RESOURCES FOR HARQ ACK/NACK SIGNAL TRANSMISSION, AND METHOD AND APPARATUS FOR HARQ ACK/NACK SIGNAL TRANSMISSION USING SAME

CROSS-REFERENCE TO RELATED APPLICATIONS

This application is the National Stage Entry of International Application PCT/KR2012/000377, filed on Jan. 17, 2012, and claims priority from and the benefit of Korean Patent Application No. 10-2011-0005637, filed on Jan. 19, 2011, both of which are incorporated herein by reference for all purposes as if fully set forth herein.

BACKGROUND

1. Field

The present invention relates to wireless communication and, more particularly, to is a wireless communication system supporting multiple carriers.

2. Discussion of the Background

In general, a wireless communication system uses a single bandwidth to transmit data. For example, a $2^{nd}$-generation wireless communication system uses a bandwidth ranging from 200 KHz to 1.25 MHz, and $3^{rd}$-generation wireless communication system uses a bandwidth ranging from 5 MHz to 10 MHz. In order to support increasing transmission capacity, recently, LTE (Long Term Evolution) or IEEE 802.16m of 3GPP (3rd Generation Partnership Project) extends the bandwidth to 20 MHz or higher. To increase transmission capacity, increasing the bandwidth may be essential, but it is not easy to assign a frequency having a high bandwidth, except for some areas in the world.

A carrier aggregation (CA) technology aiming at obtaining an effect, as if a logically high band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a carrier aggregation (CA) environment. The multi-component carrier system performs both a narrow band and a broad band by using one or more carriers. For example, when a single carrier corresponds to a bandwidth of 5 MHz, a bandwidth of a maximum of 20 MHz may be supported by using four carriers.

In order to operate the multi-CC system, various control signals are required between a base station (BS) and a terminal. For example, exchanging ACK (ACKnowledgement)/NACK (Not-ACKnowledgement) information for performing HARQ (Hybrid Automatic Repeat reQuest), exchanging CQI (Channel Quality Indicator) indicating downlink channel quality, and the like, are required.

SUMMARY

An aspect of the present invention provides a method for effectively using PUCCH resource and increasing an amount of PDSCH transmission by sharing an ACK/NACK resource indicator (ARI) mapping table based on which a plurality of mobile stations allocate resources through an ARI.

Another aspect of the present invention provides a method for more effectively and flexibly allocating PUCCH resources, which are explicitly allocated, in consideration of a channel environment and an HARQ ACK/NACK signal transmission method of a mobile station.

Another aspect of the present invention provides a method for effectively allocating even a smaller amount of PUCCH sources in transmitting an HARQ ACK/NACK signal to which spatial orthogonal resource transmit diversity (SORTD) is applied.

According to an aspect of the present invention, there is provided a method for allocating PUCCH resources of an HARQ ACK/NACK signal, including: configuring an ACK/NACK resource indicator (ARI) mapping table according to an HARQ ACK/NACK signal transmission method of a mobile station (MS); transmitting the ARI mapping table to the MS through higher layer signaling; configuring an ARI indicating PUCCH resources to be allocated to the MS in the ARI mapping table; and transmitting the ARI to the MS, wherein the ARI mapping table is transmitted to a plurality of MSs so as to be shared by the plurality of the MSs and a corresponding BS, and the ARI is configured by specifying an MS to which the PUCCH resources are to be allocated, and transmitted by diverting bits allocated to a redundantly transmitted control command field.

The HARQ ACK/NACK signal transmission method of the MS may be any one of a method for transmitting an HARQ ACK/NACK signal through PUCCH format 1b with channel selection and a method for transmitting an HARQ ACK/NACK signal through PUCCH format 3.

The ARI mapping table includes PUCCH resource sets allocated to correspond to ARI values, and at least one independent PUCCH resource set may exist with respect to any one of PUCCH resource sets.

When the number of MSs sharing the ARI mapping table is greater than a predetermined reference number, the number of the independent PUCCH resource sets may be increased.

Even when transmit diversity is applied to MSs, the number of PUCCH resources constituting the PUCCH resource sets may be increased.

With respect to a plurality of MSs sharing the same ARI mapping table, PUCCH is resources may be allocated by using ARIs indicating independent PUCCH resource sets.

The ARI mapping table may include PUCCH resource sets allocated according to ARI values, and the PUCCH resource sets may be selected from among PUCCH resources determined to be allocated to the MS according to an HARQ ACK/NACK signal transmission method regarding as to whether an HARQ ACK/NACK signal is to be transmitted through the PUCCH format 1b with channel selection or as to whether the HARQ ACK/NACK signal is to be transmitted through the PUCCH format 3, and according to whether transmit diversity is to be applied.

According to another aspect of the present invention, there is provided a method for transmitting an HARQ ACK/NACK signal, including: obtaining, by an ARI (ACK/NACK Resource Indicator) received on a downlink control channel, PUCCH resources indicated in an ARI mapping table; and transmitting an HARQ ACK/NACK signal by using the obtained PUCCH resources, wherein the ARI mapping table is transmitted from a BS to an MS through RRC signaling, the ARI is transmitted by utilizing bits to be allocated to a redundantly transmitted control command, and when an HARQ ACK/NACK signal is transmitted through PUCCH format 1b with channel selection, a channel selection table is configured with the obtained PUCCH resources, and when the HARQ ACK/NACK signal is transmitted through PUCCH format 3, the HARQ ACK/NACK signal may be transmitted by the obtained PUCCH resources.

According to another aspect of the present invention, there is provided a resource allocation method including: receiving higher layer signaling allocating a size k of resource sets used for transmission of a physical uplink control channel (PUCCH) to a mobile station (MS), from a base station (BS); receiving a physical downlink control channel (PDCCH) including transmission power control (TPC) information explicitly indicating specific resources and at least one physical downlink shared channel (PDSCH) in the resource sets from the BS through at least one downlink component carrier; and mapping an HARQ ACK/NACK signal with respect to the at least one physical downlink shared channel (PDSCH) to the specific resources and transmitting the same to the BS.

The size k may be variably allocated according to a format of the physical uplink control channel (PUCCH) within a maximum number of resources that may be allocated to the MS.

According to another aspect of the present invention, there is provided a resource allocation method including: transmitting higher layer signaling allocating a size k of resource sets used for transmission of a physical uplink control channel (PUCCH) to a mobile station (MS), to the MS; transmitting a physical downlink control channel (PDCCH) including transmission power control (TPC) information explicitly indicating specific resources and at least one physical downlink shared channel (PDSCH) in the resource sets to the MS through at least one downlink component carrier; and receiving an HARQ ACK/NACK signal with respect to the at least one physical downlink shared channel (PDSCH) mapped to the specific resources from the MS.

According to another aspect of the present invention, there is provided a mobile station (MS) including: a transceiver unit configured to receive higher layer signaling allocating a size k of resource sets used for transmission of a physical uplink control channel (PUCCH) to a mobile station (MS), from a base station (BS), receive a physical downlink control channel (PDCCH) including transmission power control (TPC) information explicitly indicating specific resources and at least one physical downlink shared channel (PDSCH) in the resource sets from the BS through at least one downlink component carrier; and transmit an HARQ ACK/NACK signal with respect to the at least one physical downlink shared channel (PDSCH) to the BS; a storage unit configured to store the higher layer signaling; and a controller configured to provide control to map the HARQ ACK/NACK signal to the specific resources.

According to embodiments of the present invention, since a plurality of mobile stations share an ARI mapping table allocating resources through an ARI, PUCCH resource can be effectively used and an amount of PDSCH transmission can be increased.

According to embodiments of the present invention, explicitly allocated PUCCH resources can be more effectively and flexibly allocated in consideration of a channel environment and an HARQ ACK/NACK signal transmission method of a mobile station.

According to embodiments of the present invention, in transmitting an HARQ ACK/NACK signal to which SORTD is applied, even a smaller amount of PUCCH resources can be effectively allocated.

DETAILED DESCRIPTION OF THE ILLUSTRATED EMBODIMENTS

Figure 1:
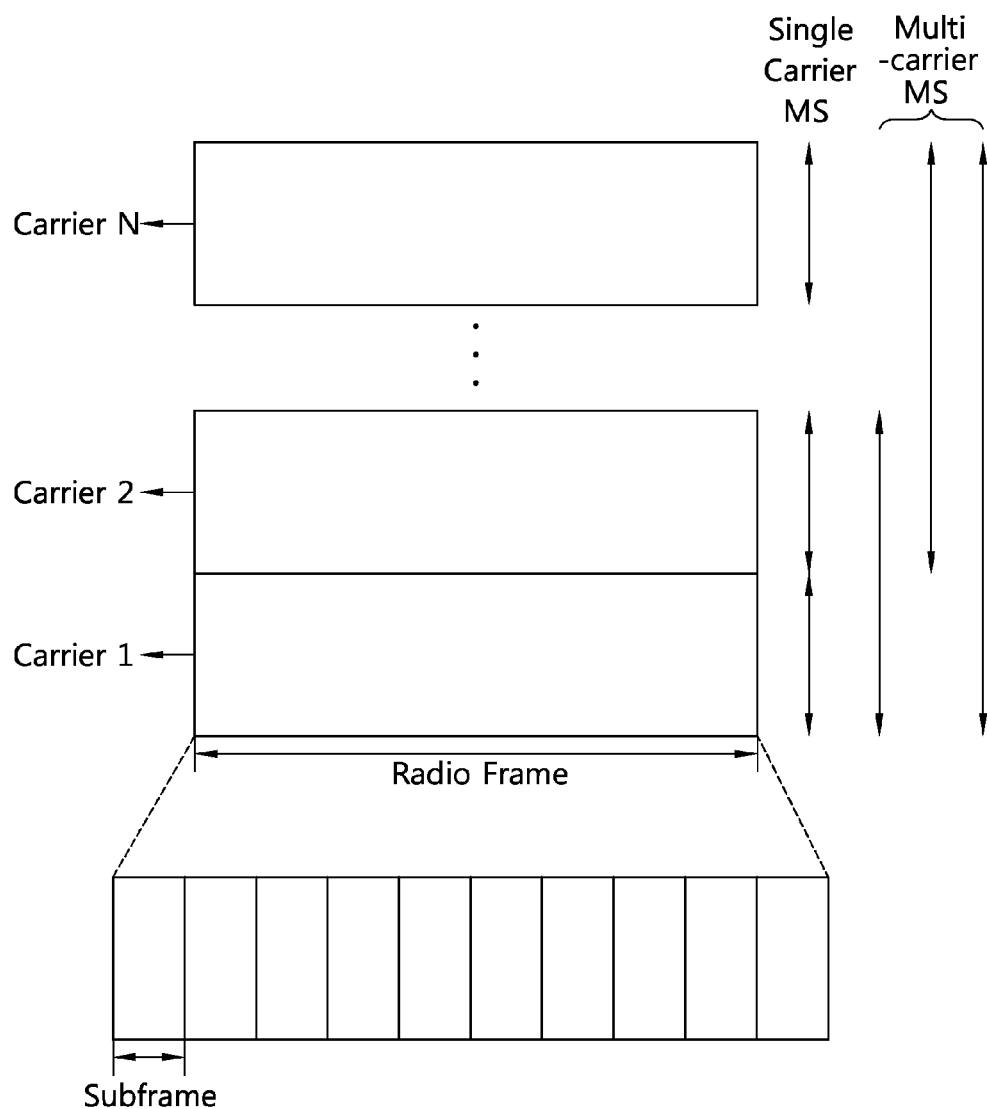
FIG. 1 is a view illustrating an example of a frame structure for a multi-carrier operation.

Hereinafter, in the present disclosure, some embodiments will be described in detail with reference to the accompanying drawings, in which like numbers refer to like elements throughout although they are shown in different drawings. In describing the present invention, if a detailed explanation for a related known function or construction is considered to unnecessarily divert the gist of the present invention, such explanation will be omitted but would be understood by those skilled in the art.

In the present disclosure, a wireless communication network will be described, and an operation performed in the wireless communication network may be performed in a process of controlling a network and transmitting data by a system (e.g., a base station (BS)) administering the corresponding wireless communication network or may be performed in a terminal (or a user equipment (UE) or a mobile station (MS)) connected to the corresponding wireless network.

A wireless communication system to which the present invention is applied may be a network structure of 3GPP LTE/LTE-A. An E-UTRAN (Evolved-UMTS Terrestrial Radio Access Network) may include a BS providing a control plane and a user plane to an MS.

A mobile station (MS) may be fixed or mobile and may be referred to by other names such as user equipment (UE), mobile terminal (MT), user terminal (UT), subscriber station (SS), wireless device, personal digital assistant (PDA), wireless modem, handheld device, etc. A BS generally refers to a station that communicates with an MS and may be called by other names such as evolved-node B (eNB), base transceiver system (BTS), access point (AP), relay, home eNB (HeNB), remote radio head (RRH), etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

Carrier aggregation (CA) supports a plurality of carriers, which is also called a spectrum aggregation or a bandwidth aggregation. Carrier aggregation is introduced to support increased throughput, prevent an increase in cost otherwise caused by an introduction of a broadband radio frequency (RF) element, and guarantee compatibility with an existing system. For example, when five component carriers are allocated as granularity of carrier unit having a 5 MHz bandwidth, a maximum 25 MHz bandwidth can be supported.

The carrier aggregation can be divided into a contiguous carrier aggregation made among component carriers consecutive in a frequency domain and a non-contiguous carrier aggregation made among component carriers inconsecutive the frequency domain. An aggregation in which the number of downlink component carriers is equal to the number of uplink component carriers is called a symmetric aggregation, and an aggregation in which the number of downlink component carriers is equal to the number of uplink component carriers is called an asymmetric aggregation.

Hereinafter, a multi-component carrier system refers to a system supporting the carrier aggregation. In the multi-carrier system, the contiguous carrier aggregation and/or a non-contiguous carrier aggregation may be used, or any of the symmetrical aggregation and the asymmetrical aggregation may be used.

FIG. 1 illustrates an example of a frame structure for a multi-carrier operation.

Referring to FIG. 1, a frame includes ten subframes. Each of the subframes a plurality of OFDM symbols. Each carrier may carrier a control channel (e.g., a physical downlink control channel (PDCCH)). Hereinafter, specifically, each carrier refers to a component carrier. Multiple component carriers may be adjacent to each other or may not. An MS may support one or more carriers according to its capability.

Component carriers may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. The MS may use only one primary component carrier or one or more secondary component carriers along with a primary component carrier. The MS may be allocated a primary component carrier and/or a secondary component carrier from the BS. A PCC may be used for an MS to enter a network and/or may be used to allocate an SCC. A carrier set as an SCC may also be changed into a PCC.

Figure 2:
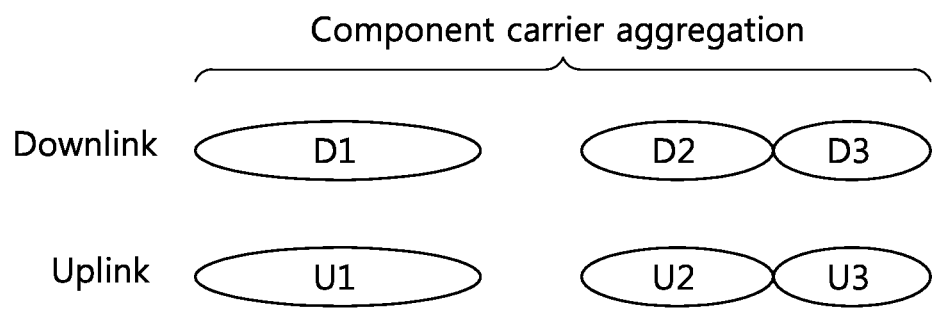
FIG. 2 is a view illustrating a linkage between downlink component carriers and uplink component carriers in a multi-carrier system.

FIG. 2 is a view illustrating a linkage between downlink component carriers and uplink component carriers in a multi-carrier system. A downlink component carrier refers to a component carrier carrying a downlink signal and an uplink component carrier refers to a component carrier carrying an uplink signal.

Referring to FIG. 2, downlink component carriers D1, D2, and D3 are aggregated in downlink, and uplink component carriers U1, U2, and U3 are aggregated in uplink. Here, Di is an index (i=1, 2, 3) of the downlink component carriers, and Ui is an index of uplink component carriers. Among the aggregated DL CCs, one downlink component carrier is a primary component carrier, and the other remaining downlink carriers are secondary component carriers. Similarly, among the aggregated UL CCs, one uplink component carrier is a primary component carrier, and the other remaining uplink carriers are secondary component carriers. For example, D1 and U1 are primary component carriers, and D2, U2, D3, and U3 are secondary component carriers.

In the carrier aggregation, a PDCCH may transmit information regarding allocation of resource of a different carrier, as well as allocation of resource within a carrier to which the pertinent PDCCH corresponds. This is known as cross-carrier scheduling. Through cross-carrier scheduling, control information regarding a secondary component carrier can be transmitted through a primary component carrier. Namely, cross-carrier scheduling is flexible.

In case of cross-carrier scheduling, a downlink grant regarding one or more controlled carriers may be transmitted through a controlling carrier. The controlling carrier may be a primary component carrier (PCC) transmitting a PDCCH indicating a PDSCH of a controlled carrier in the cross-carrier scheduling, and the controlled carrier may be a secondary component carrier (SCC) whose PDSCH is indicated by a PDCCH of the controlling carrier. All downlink grants transmit a power indicator (PI) with respect to a PUCCH of an uplink component carrier linked to a controlling carrier. In this case, one or more same PIs for controlling power with respect to the PUCCH of one or more CCs are transmitted. This resultantly works as overhead of downlink control information. Thus, when a plurality of PIs with respect to a single PUCCH exist due to the plurality of downlink grant transmissions, limited radio resource may be effectively used by using bits allocated to repeated PI fields, for transmitting different control information.

Figure 3:
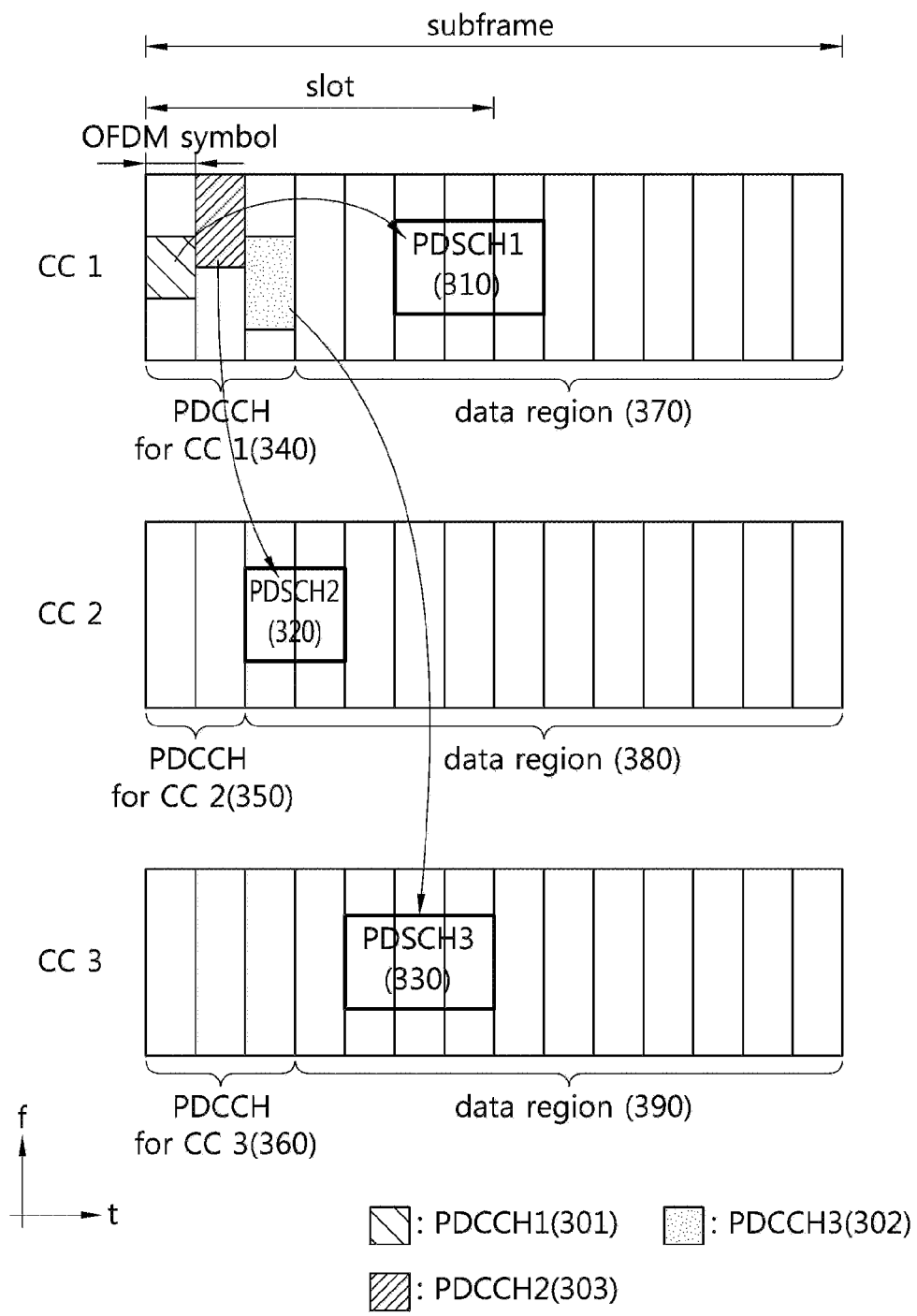
FIG. 3 is a view schematically illustrating a method for transmitting downlink control information in a multi-component carrier system.

FIG. 3 is a view schematically illustrating a method for transmitting downlink control information in a multi-component carrier system.

A case in which a multi-component carrier system provides three component carriers, i.e., CC1, CC2, and CC3, to an MS through carrier aggregation will be described with reference to FIG. 3. Among them, any one of the component carriers is a PCC and the other remaining carriers are SCCs. It is assumed that CC1 is a PCC for the description purpose.

A downlink subframe of each CC may include a control region including at least one PDCCH and a data region including at least one PDSCH. CC1 includes a data region 370 and a PDCCH 340 with respect to a PDSCH of CC1. CC2 includes a data region 380 and a PDCCH 350 with respect to a PDSCH of CC2. CC3 includes a data region 390 and a PDCCH 360 with respect to a PDSCH of CC3.

The MS may monitor a plurality of PDCCH. For example, the MS may monitor a plurality of PDCCHs according to a blind decoding scheme by using a specific RNTI (Radio Network Temporary Identifier) allocated thereto.

When CC1, CC2, and CC3 operate according to cross-carrier scheduling, CC1 may include a PDCCH regarding PDSCHs of the controlled carriers CC2 and CC3, as well as PDCCH with respect to a PDSCH thereof. For example, the PDCCH 340 with respect to the PDSCH of CC1 includes a PDCCH1 301 with respect to a PDSCH1 310, a PDCCH2 303 with respect to a PDSCH2 320, and a PDCCH3 302 with respect to a PDSCH3 330.

All the PDCCH1 301, the PDCCH2 303, and the PDCCH3 302 transmit a DCH of a format of any one of DCI 1/1A/1B/

1C/1D/2/2A. Thus, resource allocation fields included in these DCIs indicate a PDSCH of a specific component carrier. For example, a DCI of the PDCCH1 301 may indicate the PDSCH1 310 of the CC1, a DCI of the PDCCH2 303 may indicate the PDSCH2 320 of CC2, and a DCI of the PDCCH3 302 of CC3 may indicate the PDSCH3 330.

The DCI further includes various fields other than the resource allocation field. For example, in order to control transmission power of uplink, the DCI may include a transmit power control (TPC) field. In the case of the cross-carrier scheduling illustrated in FIG. 3, the DCI of the PDCCH1 301 includes a TPC1, the DCI of the PDCCH2 303 may include a TPC2, and the DCI of the PDCCH3 302 may include a TPC3.

The TPC controlling uplink transmit power may be transmitted on the PDCCH as described above.

A UE-specific TPC command operates in two different modes. An accumulative TPC command may be used in a PUSCH, a PUCCH, and an SRS. An absolute TPC command may be used in a PUSCH. With a PUSCH, conversion between the two modes is configured to be semi-static for each MS through RRC signaling. Due to the structure of PDCCH signaling, a TPC command is protected by CRC (Cyclic Redundancy Check). Thus, except for a case in which an MS does not receive a PDCCH message itself, reliability of a received TPC command is very high.

Figure 4:
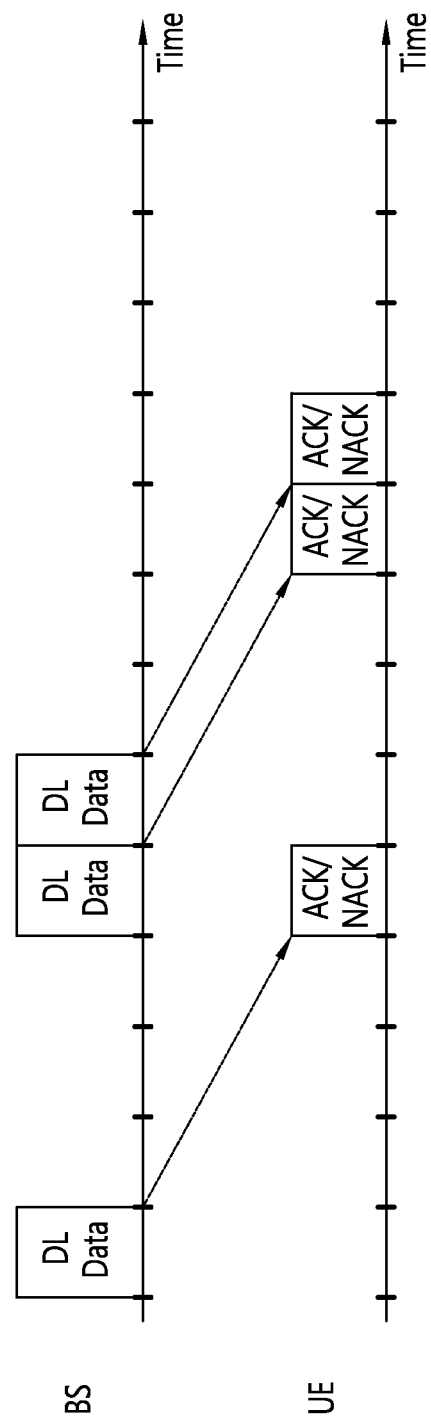
FIG. 4 is a view illustrating HARQ and CQI transmission of an MS.

FIG. 4 is a view illustrating HARQ and CQI transmission of an MS.

Referring to FIG. 4, when an MS receives downlink data (DL data) from a BS, it transmits an ACK (Acknowledgement)/NACK (Not-Acknowledgement) signal after the lapse of a certain period of time. Downlink data may be transmitted on a PDSCH indicated by a PDCCH. When the downlink data is successfully decoded, the ACK/NACK signal may be an ACK signal, and when decoding of the downlink data fails, the ACK/NACK signal is a NACK signal. When the BS receives the NACK signal, the BS may retransmit the downlink data up to a maximum number of times of retransmission.

Figure 5:
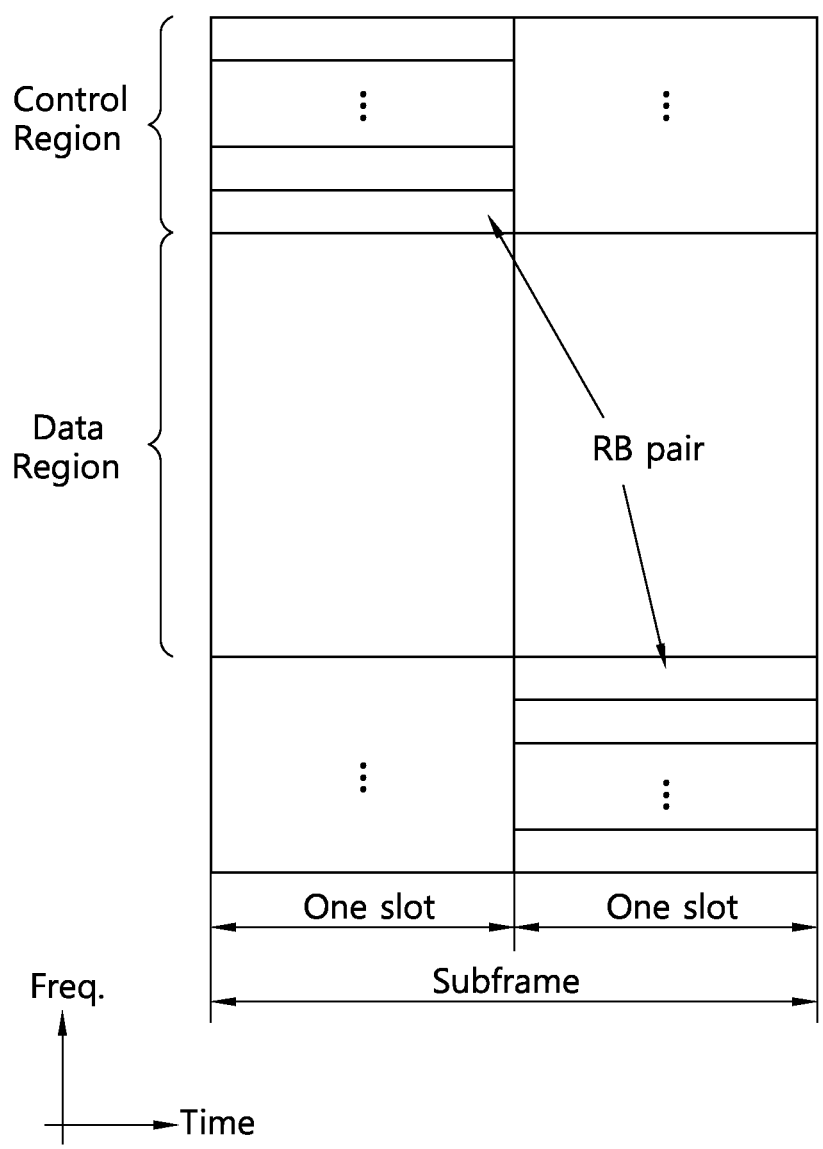
FIG. 5 is a view illustrating an example of a structure of an uplink subframe carrying an ACK/NACK signal.

FIG. 5 is a view illustrating an example of a structure of an uplink subframe carrying an ACK/NACK signal.

Referring to FIG. 5, an uplink subframe may be divided into a control region to which a physical uplink control channel (PUCCH) that carries uplink control information is allocated and a data region to which physical uplink shared channel (PUSCH) that carries user data is allocated in the frequency domain.

In the subframe, a pair of RBs are allocated to the PUCCH with respect to one MS, and the allocated resource block (RB) pair are resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. Table 1 below shows modulation schemes and number of bits according to various PUCCH formats.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used.

Control information transmitted on a PUCCH uses a cyclically shifted sequence. The cyclically shifted sequence is obtained by cyclically shifting a base sequence by a particular cyclic shift (CS) amount.

When one resource block includes 12 subcarriers, a sequence having a length of 12 as expressed by Equation 1 shown below is used as a base sequence.

$$r_i(n) = e^{jb(n)\pi/4} \quad \text{[Equation 1]}$$

Here, $i \in \{0, 1, \ldots, 29\}$ is a root index, n is a component index, $0 \le n \le N-1$, and N is a length of the sequence. A different base sequence is defined according to a different root index. In case of N=12, b(n) is defined as shown in Table 2 below.

TABLE 2

| i | b(0), ..., b(11) | | | | | | | | | | | |
| --- | --- | --- | --- | --- | --- | --- | --- | --- | --- | --- | --- | --- |
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

Thus, the base sequence r(n,a) may be cyclically shifted as expressed by Equation 2.

$$r(n,a) = r((n|a) \bmod N), \text{ for } n=0, \ldots, N-1 \quad \text{[Equation 2]}$$

Here, 'a' is the cyclic shift amount, and 'mod' is a modulo operation.

A resource index $n(1)_{PUCCH}$ as resource for transmitting PUCCH formats 1, 1a, and 1b are used to determine a CS amount $\alpha(n_s, 1)$ of the base sequence and an orthogonal sequence index $n_{OC}(n_s)$, as well as a position of a physical resource block in which an A/N signal is transmitted. Resource index $n^{(1)}_{PUCCH}$ for the HARQ ACK/NAK signal is obtained as shown in Table 5 below. The resource index $n^{(1)}_{PUCCH}$ is a parameter for determining a physical RB index $n_{PRB}$, the CS amount of the base sequence, the orthogonal sequence index $n_{OC}(n_s)$, and the like.

TABLE 3

|  | Dynamic scheduling | Semi-persistent scheduling |
|---|---|---|
| Resource index | $n^{(1)}_{PUCCH} = n_{CCE} + N^{(1)}_{PUCCH}$ | Signaled by using higher layer signaling and control channel |
| Higher layer signaling value | $N^{(1)}_{PUCCH}$ | $n^{(1)}_{PUCCH}$ |

Namely, according to Table 3, the HARQ ACK/NACK signal with respect to the PDSCH transmitted in the nth subframe is transmitted in the (n+4)th subframe by using the is resource index $n^{(1)}_{PUCCH}$ as the sum of a first CCE (control channel element) index $n_{CCE}$ of the PDCCH transmitted in the nth subframe and the value $N^{(1)}_{PUCCH}$ obtained through higher layer signaling or a control channel. $N^{(1)}_{PUCCH}$ is a total number of PUCCH formats 1/1a/1b resources required for semi-persistent scheduling (SPS) transmission and a service request (SR) transmission. In case of the SPS transmission and the SR transmission, since a PDCCH indicating a corresponding PDSCH transmission does not exist, the BS explicitly informs the MS about $n^{(1)}_{PUCCH}$.

The HARQ ACK/NACK signal and/or SR are transmitted through the PUCCH formats 1, 1a, and 1b, physical RB index $n_{PRB}$ is determined by the resource index $n^{(1)}_{PUCCH}$. This is as shown in Equation 3 below.

$$m = \begin{cases} N^{(2)}_{RB} & \text{if } n^{(1)}_{PUCCH} < c \cdot N^{(1)}_{cs}/\Delta^{PUCCH}_{shift} \\ \left\lfloor \frac{n^{(1)}_{PUCCH} - c \cdot N^{(1)}_{cs}/\Delta^{PUCCH}_{shift}}{c \cdot N^{RB}_{sc}/\Delta^{PUCCH}_{shift}} \right\rfloor + N^{(2)}_{RB} + \left\lceil \frac{N^{(1)}_{cs}}{8} \right\rceil & \text{otherwise} \end{cases}$$

$$c = \begin{cases} 3 & \text{normal cyclic prefix} \\ 2 & \text{extended cyclic prefix} \end{cases}$$

$$n_{PRB} = \begin{cases} \left\lfloor \frac{m}{2} \right\rfloor & \text{if } (m+n_s \bmod 2)\bmod 2 = 0 \\ N^{UL}_{RB} - 1 - \left\lfloor \frac{m}{2} \right\rfloor & \text{if } (m+n_s \bmod 2)\bmod 2 = 1 \end{cases}$$

[Equation 3]

Figure 6:
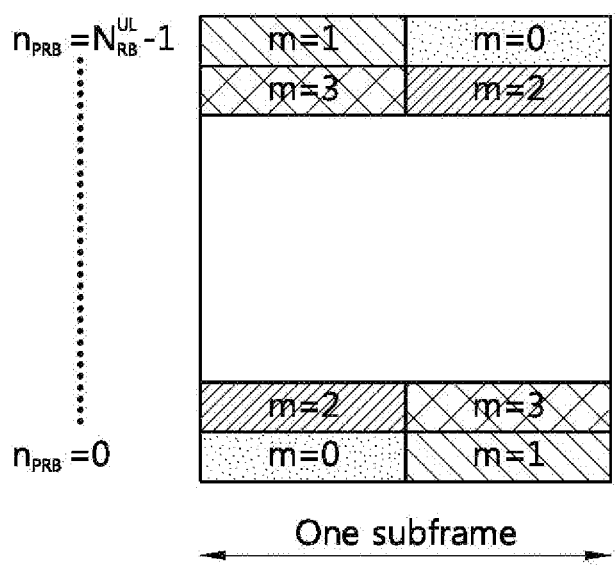
FIG. 6 is a view illustrating an example of mapping a PUCCH to physical RBs according to Equation 4.

FIG. 6 is a view illustrating an example of mapping a PUCCH to physical RBs according to Equation 4. A physical RB index $n_{PRB}$ is determined according to a resource index $n^{(1)}_{PUCCH}$, and a PUCCH corresponding to each m is frequency-hopped by slots.

In a carrier aggregation environment, an uplink HARQ ACK/NACK signal with respect to data over multiple downlink component carriers may be transmitted through a single uplink component carrier. Here, 1-bit ACK/NACK signal per codeword (CW) is transmitted.

An HARQ ACK/NACK signal with respect to downlink data is mapped to a PUCCH so as to be transmitted. A PUCCH format used to transmit the HARQ ACK/NACK signal with respect to downlink data includes formats 1a and 1b. The PUCCH format 1b with channel selection may transmit a 2 to 4-bit ACK/NACK signal.

In channel selection, PUCCH resource with respect to downlink data is allocated by using a channel selection table in which a message to be transmitted and resource and to modulation symbols to be used for transmission of the corresponding message are mapped.

The channel selection table is a table mapping PUCCH resource to be used for transmission and symbols according to types of signals to be transmitted, e.g., ACK/NACK signals. The channel selection table may include a combination of a plurality of resource indices and modulation symbols of an ACK/NACK signal, and may be configured in consideration of the number (M) of is bits used to transmit the ACK/NACK signal. Resource required for transmitting a maximum 4-bit signal can be allocated through channel selection. Thus, with respect to an ACK/NACK signal having less than 4 bits, a table may be configured according to a value of the number (M) of bits required for transmitting the ACK/NACK signal, and ACK/NACK resource may be allocated by using the table.

A format of the channel selection table may be transmitted to an MS and a BS in advance through higher layer signaling. The MS may obtain an ACK/NACK resource index for configuring the channel selection table through a PDCCH, signaling of a higher layer, a transport channel, or the like.

In order to transmit an ACK/NACK signal, the BS may allocate ACK/NACK resource index implicitly. Implicitly allocating an ACK/NACK resource index implicitly by a BS refers to allocating a resource index calculated by using $n_{CCE}$, which signifies a number of a CCE among at least one CCE constituting a PDCCH of CC#a, as a parameter. The BS may also allocate a resource index explicitly. Explicitly allocating a resource index by a BS refers to allocating a resource index of a PUCCH dedicated to a particular terminal, to a terminal from the BS through a resource allocation indicator, or the like.

Meanwhile, an MS transmits an HARQ ACK/NACK signal to a BS through several methods. Hereinafter, methods for transmitting an HARQ ACK/NACK signal by an MS and a method for allocating resource used for transmission will be described in detail.

<HARQ ACK/NACK Signal Transmission Method>

Referring to Table 1 as described above, PUCCH formats for transmitting an HARQ ACK/NACK signal include PUCCH formats 2a/2b and PUCCH formats 1a/1b. Among them, the PUCCH formats 2a/2b are used for a CQI transmission, by which a HARQ ACK/NACK signal may be transmitted together, while a CQI is being transmitted.

PUCCH formats for transmitting only an HARQ ACK/NACK signal include PUCCH formats 1a/1b. In particular, the PUCCH format 1b may be able to transmit a 2 to 4-bit HARQ ACK/NACK signal by using channel selection. Also, in addition to the PUCCH format of 3GPP LTE stated in Table 1 as described above, a PUCCH format 3 has also been discussed. The PUCCH format 3 may multiplex an ACK/NACK signal up to 20 bits and transmit the same.

Here, transmission of an HARQ ACK/NACK signal using channel selection and transmission of an HARQ ACK/NACK signal by using the PUCCH format 3 will be described in detail.

Transmission Using Channel Selection (PUCCH Format 1b with Channel Selection)

With respect to an HARQ ACK/NACK signal of 4 bits or smaller, resource may be allocated through channel selection using the PUCCH format 1b. Hereinafter, channel selection for PUCCH resource allocation will be described in detail. A channel selection table is configured differently according to a value M (the number of HARQ response signals to be transmitted by a single symbol value), and the number of resource indices for configuring a channel selection table may vary according to the value M.

The MS may map an ACK/NACK signal to be transmitted on the channel selection is table and ACK/NACK resource to be used for transmission to allocate the ACK/NACK resource. The MS transmits the ACK/NACK signal by using the allocated ACK/NACK resource.

Here, it is described that a single antenna is used to transmit a downlink HARQ ACK/NACK signal, but the present invention is not limited thereto and may be applicable to a case of multi-antenna transmission using two or more antennas. This will be described later.

Table 4 shows a channel selection table in case of M=2.

TABLE 4

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

Table 5 shows a channel selection table in case of M=3.

TABLE 5

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

Table 6 shows a channel selection table in case of M=4.

TABLE 6

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 4 to Table 6, HARQ-ACK(0)~HARQ-ACK(3) is an ACK/NACK type for a codeword to be determined whether it has been normally received (decoded).

$n^{(1)}_{PUCCH}$ is PUCCH resource to be used for transmission of the PUCCH format 1b with channel selection. Here, respective ACK/NACK resources, e.g., {$n^{(1)}_{PUCCH,0}$, $n^{(1)}_{PUCCH,1}$} in case of M=2, {$n^{(1)}_{PUCCH,0}$, $n^{(1)}_{PUCCH,1}$, $n^{(1)}_{PUCCH,2}$} in case of M=3, {$n^{(1)}_{PUCCH,0}$, $n^{(1)}_{PUCCH,1}$, $n^{(1)}_{PUCCH,2}$, $n^{(1)}_{PUCCH,3}$} in case of M=4, constituting the channel selection table may be allocated from the BS. This will be described in relation to a method for allocating PUCCH resource.

b(0) and b(1) are QPSK symbols of an ACK/NACK signal to be transmitted. When the values of b(0) and b(1) are mapped to N/A (namely, in case of DTX (Discontinuous Transmission) or when an MS fails to receive a PDCCH), the MS does not transmit an ACK/NACK response in a subframe n.

ACK/NACK signals, decoding results of PDSCHs received by the MS, correspond to specific ACK/NACK resource ($n^{(1)}_{PUCCH}$) and the transmission symbols (b(0), b(1)) in the channel selection table. Thus, the MS maps the transmission symbols (b(0), b(1)) corresponding to the ACK/NACK signal to the ACK/NACK resource ($n^{(1)}_{PUCCH}$) and transmit the same on a PUCCH. For example, in case of M=3, when types of ACK/NACK signals are all ACK, the MS maps values (1, 1) of the corresponding symbols (b(0), b(1)) to the ACK/NACK resource $n^{(1)}_{PUCCH,1}$ and transmits the same on a PUCCH.

In case of the PUCCH format 1b with channel selection, the same number of resources as the number of bits of the transmitted HARQ ACK/NACK signals is required and HARQ ACK/NACK signals up to a maximum of 4 bits may be transmitted.

The foregoing channel selection table is an example for describing a technical concept of the present invention. The present embodiment is not limited thereto and, as mentioned above, the channel selection table may be configured in various manners within the scope of the technical concept of the present invention.

Transmission Using PUCCH Format 3

In addition to the PUCCH formats stated in Table 1, a PUCCH format 3 has been additionally discussed. The PUCCH format 3 is a PUCCH format employing DFT-S-OFDM (Discrete Fourier Transform—Spreading—Orthogonal Frequency-Division Multiplexing), which uses DFT-IFFT and block-spreading. When an HARQ ACK/NACK signal is transmitted by using the PUCCH format 3, information having a maximum of 10 bits in case of FDD and information having a maximum of 20 bits in case of TDD can be transmitted by an HARQ ACK/NACK signal through single ACK/NACK resource.

Figure 7:
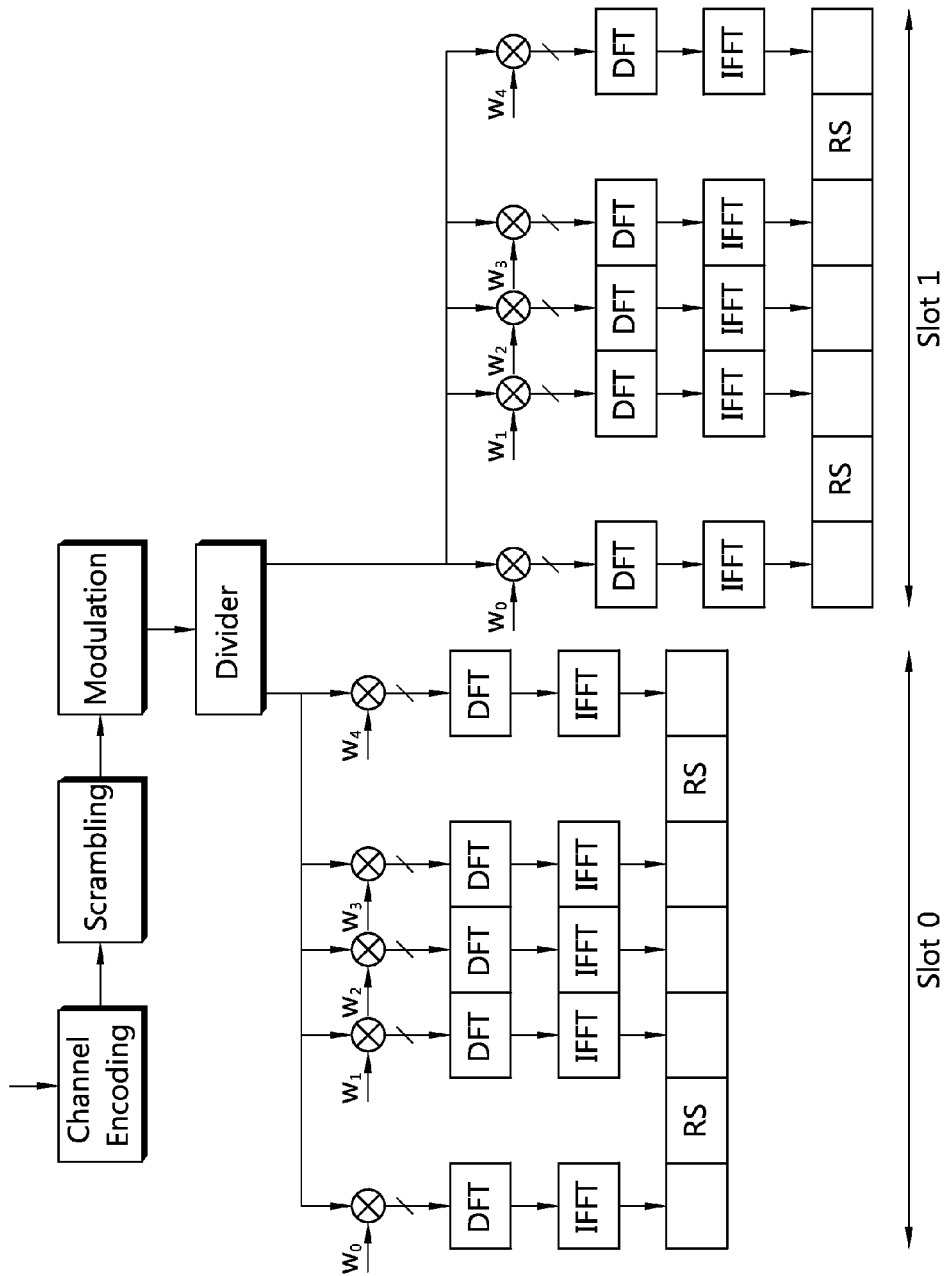
FIG. 7 is a view schematically illustrating an example of PUCCH format 3 in case of a normal CP.

FIG. 7 is a view schematically illustrating an example of PUCCH format 3 in case of a normal CP. In a normal CP, in case of the PUCCH format 3, one slot includes seven OFDM symbols, and here, two OFDM symbols are RS OFDM symbols for a reference signal and five OFDM symbols are data OFDM symbols for an uplink control signal, e.g., an ACK/NACK signal. Here, the number of the RS OFDM symbols and the data OFDM symbols is merely illustrative.

First, channel coding is performed on information bits of an ACK/NACK signal to be transmitted by a component carrier. Various types of channel coding may be applied. For example, any one of simple repetition, simplex coding, RM (Reed-Muller) coding, punctured RM coding, TBCC (Tail-Biting Convolutional Coding), LDPC (Low Density Parity Check) coding, turbo coding, and the like, may be used. A coding information bit generated according to channel coding results may be rate-matched in consideration of resource mapped to a modulation symbol order to be applied.

Cell-specific scrambling using a scrambling code corresponding to a cell ID or a UE-specific scrambling using a scrambling code corresponding to an MS ID such as RNTI (Radio Network Temporary Identifier) may be applied to the encoding information bit generated according to the channel coding results in consideration, This is to overcome inter-cell interference (ICI).

Thereafter, the encoding information bit is modulated through a modulator. The encoding information bit may be modulated to generate QPSK symbols. The modulated symbols are distributed to first and second slots by a divider. The modulated symbols may be distributed according to various methods. Order of the modulator and the divider may be changed.

The modulated symbols are time-spread through an orthogonal code of an index m determined through RRC (Radio Resource Control) signaling, or the like. When a spreading factor (SF) is 5, the orthogonal code having the index m may be expressed by wm=[w0, w1, w2, w3, w4] as illustrated in FIG. 6. As the orthogonal code, a Walsh code, a DFT code, or any other orthogonal code may be used. Here, the spreading factor refers to a factor by which data is spread, and it may differ according to a system. A spreading factor may be related to the amount of multiplexed terminals or antennas, and an index may be changed in a slot level so as to be applied.

The spread modulation symbols are DFT (Discrete Fourier Transform)-precoded, carried in a subcarrier within a PRB (Physical Resource Block), and subsequently converted into a signal of a time domain through IFFT (Inverse Fast Fourier Transform), and after a CP is added thereto, the signal is transmitted. Here, an implementation example of the PUCCH format 3 is described, but the PUCCH format 3 may be variously implemented and the present invention is not limited to the particular implementation example of the PUCCH format 3.

Transmission Using SORTD (Spatial Orthogonal Resource Transmit Diversity)

In uplink transmission, an HARQ ACK/NACK signal may be transmitted by using a single antenna, or it may be transmitted by using SORTD (Spatial Orthogonal Resource Transmit Diversity).

In a multi-antenna transmission system, an MS may obtain transmit diversity by transmitting the same uplink HARQ ACK/NACK symbol through different antennas by using different resources.

In order for the MS to transmit a downlink HARQ ACK/NACK signal by using two antennas, resources double that used for a single antenna is required.

For example, in case of transmitting an HARQ ACK/NACK signal, when PUCCH resources are allocated to two antennas on the basis of channel selection by applying SORTD, PUCCH resources double that allocated to a single antenna on the basis of channel selection is required. Also, when PUCCH resources are allocated to only one of two antennas on the basis of channel selection, more PUCCH resources than that for a case in which PUCCH resources are allocated to a single antenna on the basis of channel selection are required.

Also, even in case of transmitting an HARQ ACK/NACK signal through the PUCCH format 3 by applying SORTD, PUCCH resources double that for transmitting an HARQ ACK/NACK signal through the PUCCH format 3 by using a single antenna are required.

The MS may transmit an HARQ ACK/NACK signal to the BS in various manners. A scheme in which the MS transmits the HARQ ACK/NACK signal may be determined in advance between the BS and the MS.

The BS may allocate PUCCH resource of the MS according to the scheme in which the MS transmits the HARQ ACK/NACK signal. For example, the MS may be allocated implicitly PUCCH resource from a first CCE (Control Channel Element) index of a PDCCH received in a PCC. Also, the MS may be explicitly allocated PUCCH resource through higher layer signaling from the BS.

Meanwhile, in the case in which PUCCH resource is allocated by MSs and PUCCH resource to be used for current transmission is selected from among PUCCH resources allocated by MSs is selected to transmit an HARQ ACK/NACK signal, overhead according to resource allocation is increased. In particular, in a cell in which there are many MSs to which SORTD is applied or in a cell in which there are many MSs supporting a carrier aggregation environment, overhead according to resource allocation is further increased.

Here, when a plurality of MSs divide and use specific available PUCCH resource and a BS indicates PUCCH to be used for each MS, a demand for PUCCH resource required for a system operation may be significantly reduced. For example, in a case in which two terminals using a single antenna divide and use available PUCCH resource, the number of PUCCH resources required for being allocated to the two terminals may be halved. Since a PUCCH region transmitting control information is reduced and a PUCCH region transmitting data information is increased in uplink, PUCCH resource can be effectively used and an amount of data transmitted on a PUSCH can be increased.

In a case in which more PUCCH resource is required for transmitting an HARQ ACK/NACK signal, like the case in which SORTD is applied, when a plurality of MSs share to use specific PUCCH resource, effects of increasing a data rate and effectively using PUCCH resource can be further increased.

Hereinafter, a PUCCH resource allocation method by which a plurality of MSs share available PUCCH resources and a BS can designate which PUCCH is to be used by each MS will be described in detail.

<Method for Allocating PUCCH Resource of HARQ ACK/NACK Signal—ARI>

A BS may explicitly allocate a PUCCH resource to be used for an MS to transmit an HARQ ACK/NACK signal, to an MS. For example, a BS may transmit an ACK/NACK resource indicator (ARI) to an MS to explicitly allocate PUCCH resource to be used by the MS. The ARI is an indicator for explicitly allocating resource to be used for an MS to transmit an HARQ ACK/NACK signal with respect to downlink.

When allocating PUCCH resource to the MS by using an ARI, the BS may transmit an ARI to the MS by diverting resource to be used for transferring different control information. For example, the BS may transmit an ARI by diverting 2 bits allocated to a TPC field which is to be redundantly transferred through each CC in a CA environment. For example, the BS may transmit a TPC command for controlling uplink transmission power of the MS on a PDCCH of a PCC and transmit an ARI by diverting 2 bits allocated to a TPC field transmitted on a PDCCH of an SCC. Since the ARI is transmitted by diverting a data region to be allocated for a control command which is to be redundantly transferred, limited radio resource can be more effectively used.

In a case in which the BS allocates PUCCH to be used for the MS to transmit an HARQ ACK/NACK signal to the MS by using an ARI, an ARI mapping table required for determining to which PUCCH resource a value indicated by the ARI corresponds, may be transferred in advance to the MS from the BS through higher layer signaling such as RRC signaling, or the like.

In a case in which the MS transmits an HARQ ACK/NACK signal to the BS through the PUCCH format 1b with channel selection, the MS may configure a channel selection table as shown in Table 4 to Table 6 with obtained PUCCH resource.

In a case in which the MS transmits an HARQ ACK/NACK signal to the BS through the PUCCH format 3, the MS may transmit the HARQ ACK/NACK signal by using obtained PUCCH resource through the PUCCH format 3.

In a case in which an MS employing SORTD using two antennas transmits an HARQ ACK/NACK signal through the PUCCH format 1b with channel selection, the BS may apply channel selection to one antenna and allocate one PUCCH resource explicitly to the other antenna. Here, an ARI mapping table may be configured such that more PUCCH resources are allocated than those of a case of using a single antenna. Also, in a case in which an MS employing SORTD using two antennas transmits an HARQ ACK/NACK signal through the PUCCH format 1b with channel selection, the BS may apply channel selection to the two antennas, respectively. In this case, an ARI mapping table may be configured such that PUCCH resources as much as double that of the case using a single antenna are allocated.

In a case in which an MS employing SORTD using two antennas transmits an HARQ ACK/NACK signal through the PUCCH format 3, the BS may allocate PUCCH resource to the two antennas through an ARI. Here, an ARI mapping table may be configured such that PUCCH resources as much as double the case of using a single antenna.

Hereinafter, for the description purpose, the PUCCH format 1b and the PUCCH format 3 with channel selection, respectively, will be described in more detail.

PUCCH Format 1b with Channel Selection

In a case in which an MS transmits an HARQ ACK/NACK signal through the PUCCH format 1b with channel selection, the BS may determine the number of PUCCH resources to be allocated to the MS according to a value 'M'. In a case in which SORTD is applied to the MS, the BS may additionally allocate one or more PUCCH resources.

① Case of Using Single Antenna

Table 7 shows an example of an ARI mapping table for allocating PUCCH resource required for an MS to transmit an HARQ ACK/NACK signal via a single antenna through the PUCCH format 1b with channel selection having 2 as a value 'M'. Since the value 'M' is 2, is two PUCCH resources are allocated to configure a channel selection table. The BS may configure an ARI mapping table with PUCCH resources selected from among k number of PUCCH resource set $N=\{n_1, n_2, \ldots, n_k\}$.

TABLE 7

| ACK/NACK Resource Indicator | Selected ACK/NACK resources |
|---|---|
| 00 | First PUCCH resource set, $\{n_1, n_2\}$ |
| 01 | Second PUCCH resource set, $\{n_1, n_3\}$ |
| 10 | Third PUCCH resource set, $\{n_2, n_k\}$ |
| 11 | Fourth PUCCH resource set, $\{n_3, n_k\}$ |

As described above, Table 7 shows an example of an ARI mapping table for allocating two PUCCH resources. The ARI mapping table, which allocates resources required when the MS transmits an HARQ ACK/NACK signal via a single antenna through the PUCCH format 1b with channel selection having 2 as the value 'M', may be variously configured to satisfy an ARI mapping table creation method as described hereinafter with respect to k number of PUCCH resources (here, k≥4).

The ARI mapping table of Table 7 may be shared by a BS and a plurality of MSs. When the BS transmits an ARI to each MS, each MS checks an ARI allocating PUCCH resource to be used, and obtains PUCCH resource of a PUCCH resource subset in the ARI mapping table according to the corresponding ARI. For example, in a case in which an ARI value indicating PUCCH resource to be allocated to a terminal $UE_m$ is 00, the terminal $UE_m$ may obtain PUCCH resources $\{n_1, n_2\}$. Here, the BS may designate 11 as the ARI value indicating PUCCH resource to be allocated to a terminal $UE_{m+1}$, to allow the terminal $UE_{m+1}$ to obtain PUCCH resources $\{n_3, n_k\}$ (k≠1, 2, 3).

Table 8 shows an example of an ARI mapping table for allocating resource required for an MS to transmit an HARQ ACK/NACK signal via a single antenna according to the PUCCH format 1b with channel selection having 3 as a value 'M'. Since the value 'M' is 3, three PUCCH resources are allocated to configure a channel selection table. The BS may configure an ARI mapping table with PUCCH resources selected from among k number of PUCCH resource set $N=\{n_1, n_2, \ldots, n_k\}$.

TABLE 8

| ACK/NACK Resource Indicator | Selected ACK/NACK resources |
|---|---|
| 00 | First PUCCH resource set, $\{n_1, n_2, n_3\}$ |
| 01 | Second PUCCH resource set, $\{n_1, n_3, n_4\}$ |
| 10 | Third PUCCH resource set, $\{n_4, n_{k-1}, n_k\}$ |
| 11 | Fourth PUCCH resource set, $\{n_2, n_{k-1}, n_k\}$ |

As mentioned above, Table 8 is an ARI mapping table allocating three PUCCH resources. For example, the ARI mapping table in case that the MS transmits an HARQ ACK/NACK signal via a single antenna through the PUCCH format 1b with channel selection having 3 as the value 'M', may be variously configured to satisfy an ARI mapping table creation method as described hereinafter with respect to k number of PUCCH resources (here, k≥6).

The ARI mapping table of Table 8 may be shared by a BS and a plurality of MSs. When the BS transmits an ARI to each MS, each MS checks an ARI allocating PUCCH resource to be used, and obtains PUCCH resource of a PUCCH resource subset in the ARI mapping table according to the corresponding ARI. For example, in a case in which an ARI value indicating PUCCH resource to be allocated to a terminal $UE_m$ is 01, the terminal $UE_m$ may obtain PUCCH is resources $\{n_1, n_3, n_4\}$. Here, the BS may designate 11 as the ARI value indicating PUCCH resource to be allocated to a terminal $UE_{m+1}$, to allow the terminal $UE_{m+1}$ to obtain PUCCH resources $\{n_2, n_{k-1}, n_k\}$ (k≠1, 2, 3, 4, 5).

Table 9 shows an example of an ARI mapping table for allocating resource required for an MS to transmit an HARQ ACK/NACK signal via a single antenna according to the PUCCH format 1b with channel selection having 4 as a value 'M'. Since the value 'M' is 4, three PUCCH resources are allocated to configure a channel selection table. The BS may configure an ARI mapping table with PUCCH resources selected from among k number of PUCCH resource set $N=\{n_1, n_2, \ldots, n_k\}$.

TABLE 9

| ACK/NACK Resource Indicator | Selected ACK/NACK resources |
|---|---|
| 00 | First PUCCH resource set, $\{n_1, n_2, n_3, n_4\}$ |
| 01 | Second PUCCH resource set, $\{n_1, n_3, n_4, n_5\}$ |
| 10 | Third PUCCH resource set, $\{n_2, n_{k-2}, n_{k-1}, n_k\}$ |
| 11 | Fourth PUCCH resource set, $\{n_{k-3}, n_{k-2}, n_{k-1}, n_k\}$ |

As described above, Table 9 shows an example of an ARI mapping table for allocating three PUCCH resources. The ARI mapping table, which allocates resources required when the MS transmits an HARQ ACK/NACK signal via a single antenna through the PUCCH format 1b with channel selection having 4 as the value 'M', may be variously configured to satisfy an ARI mapping table creation method as described hereinafter with respect to k number of PUCCH resources (here, k≥8).

The ARI mapping table of Table 9 may be shared by a BS and a plurality of MSs. When the BS transmits an ARI to each MS, each MS checks an ARI allocating PUCCH resource to be used, and obtains PUCCH resource of a PUCCH resource subset in the ARI mapping table according to the corresponding ARI. For example, in a case in which an ARI value indicating PUCCH resource to be allocated to a terminal $UE_m$ is 00, the terminal $UE_m$ may obtain PUCCH resources $\{n_1, n_2, n_3, n_4\}$. Here, the BS may designate 11 as the ARI value indicating PUCCH resource to be allocated to a terminal $UE_{m+1}$, to allow the terminal $UE_{m+1}$ to obtain PUCCH resources $\{n_{k-3}, n_{k-2}, n_{k-1}, n_k\}$ (k≠11, 2, 3, 4, 5, 6, 7).

In case of configuring an ARI mapping table, PUCCH resources constituting each PUCCH resource subset may be common to a plurality of PUCCH resource subsets. Thus, the ARI mapping table may be configured with a smaller amount of PUCCH resources than those of the case in which each PUCCH resource sub-group is configured with separate PUCCH resources. Since a plurality of PUCCH resource subsets may include the same PUCCH resource as an element, the number of elements of the entire PUCCH resource sets can be reduced and an effective use of PUCCH resources and an increase in a PUSCH transmission amount can be promoted. In this case, however, among the respective PUCCH resource subsets (first to fourth PUCCH resource sets) constituting the ARI mapping table, at least two PUCCH resource subsets are required to be configured such that respective elements thereof do not overlap with each other, in order to allow a plurality of MSs to be allocated resources simultaneously by using the shared ARI mapping table. Thus, the PUCCH resource set N includes a minimum amount of PUCCH resources satisfying the condition.

For example, an ARI mapping table allocating resources required when an MS transmits an HARQ ACK/NACK signal via a single antenna through the PUCCH format 1b with channel selection having 2 as a value 'M' may be configured with three PUCCH resources $\{n_1, n_2, n_3\}$ as follows.

TABLE 10

| ACK/NACK Resource Indicator | Selected ACK/NACK resources |
|---|---|
| 00 | First PUCCH resource set, $\{n_1, n_2\}$ |
| 01 | Second PUCCH resource set, $\{n_1, n_3\}$ |
| 10 | Third PUCCH resource set, $\{n_2, n_4\}$ |
| 11 | Fourth PUCCH resource set, $\{n_3, n_4\}$ |

Using the ARI mapping table of Table 10, at least two MSs may configure a channel selection table simultaneously.

② In Case that SORTD is Applied

In a case in which SORTD using multiple antennas is applied, a BS is required to additionally allocate one or more PUCCH resources according to antennas of an MS to which SORTD is applied.

The BS may allocate PUCCH resources with respect to some of multiple antennas is of the MS to which SORTD is applied, through channel selection, and may directly allocate specific PUCCH resources with respect to the other remaining antennas.

For example, in a case in which SORTD using two antennas is applied, the BS may configure an ARI mapping table allocating PUCCH resources required for transmitting an HARQ ACK/NACK signal through the PUCCH format 1b with channel selection via a single antenna and allocating a single PUCCH resource to be used for transmission via the other remaining antennas. Thus, in case of M=2, the BS may configure an ARI mapping table allocating three PUCCH resources, in case of M=3, the BS may configure an ARI mapping table allocating four PUCCH resources, and in case of M=4, the BS may configure an ARI mapping table allocating five PUCCH resources. In comparison to the cases of Table 8 to Table 10, one additionally allocated PUCCH resource is directly allocated for transmission of an HARQ ACK/NACK signal via a first antenna among first and second antennas constituting multiple antennas, and the other remaining PUCCH resources may be used to configure a channel selection table for allocating PUCCH resources for transmission of an HARQ ACK/NACK signal via the second antenna.

Also, the BS may allocate PUCCH resources through channel selection with respect to all the multiple antennas of the MS to which SORTD is applied.

For example, in case of applying SORTD using two antennas is applied, the BS may configure a channel selection table for each antenna. Thus, in comparison to the cases of Table 8 to Table 10, double PUCCH resources are allocated for each ARI value. Namely, in case of M=2, two PUCCH resources should be allocated for a single antenna, so four PUCCH resources may be allocated with respect to each ARI value. Similarly, in case of M=3, six PUCCH resources may be allocated with respect to each ARI value, and in case of M=4, eight PUCCH resources may be allocated with respect to each ARI value.

PUCCH Format 3

In a case in which an MS transmits an HARQ ACK/NACK signal through the PUCCH format 3, the BS may allocate PUCCH resources to be used for the MS to transmit the HARQ ACK/NACK signal by using an ARI. In a case in which SORTD is applied to the MS, the BS may additionally allocate PUCCH resources.

① In Case of Using Single Antenna

Table 11 shows an example of an ARI mapping table allocating resources required for an MS to transmit an HARQ ACK/NACK signal via a single antenna through the PUCCH format 3. The BS may configure the ARI mapping table with PUCCH resources selected from among k number of PUCCH resource set $N=\{n_1, n_2, \ldots, n_k\}$.

TABLE 11

| ACK/NACK Resource Indicator | Selected ACK/NACK resources |
| --- | --- |
| 00 | First PUCCH resource set, $\{n_1\}$ |
| 01 | Second PUCCH resource set, $\{n_2\}$ |
| 10 | Third PUCCH resource set, $\{n_3\}$ |
| 11 | Fourth PUCCH resource set, $\{n_k\}$ |

As described above, Table 11 is an example of an ARI mapping table allocating a single PUCCH resource. The ARI mapping table allocating resources required for the case in which the MS transmits an HARQ ACK/NACK signal through the PUCCH format 3 may be variously configured to satisfy an ARI mapping table creation method as described hereinafter.

The ARI mapping table of Table 11 may be shared by a BS and a plurality of MSs. When the BS transmits an ARI to each MS, each MS checks an ARI allocating PUCCH resource to be used, and obtains PUCCH resource of a PUCCH resource subset in the ARI mapping table according to the corresponding ARI. For example, in a case in which an ARI value indicating PUCCH resource to be allocated to a terminal $UE_m$ is 00, the terminal $UE_m$ may obtain PUCCH resource $\{n_i\}$. Here, the BS may designate 11 as the ARI value indicating PUCCH resource to be allocated to a terminal $UE_{m+1}$, to allow the terminal $UE_{m+1}$ to obtain PUCCH resource $\{n_k\}$ ($k \neq 1, 2, 3$).

The MS may transmit the HARQ ACK/NACK signal through the PUCCH format 3 using the obtained PUCCH resource.

② In Case that SORTD is Applied

In order to transmit an HARQ ACK/NACK signal through the PUCCH format 3 by applying SORTD, the BS is required to allocate PUCCH resources according to the number of antennas of an MS to which SORTD is applied.

For example, in a case in which SORTD is applied to the MS by using multiple antennas including i number of antennas, the BS may configure an ARI mapping table such that i number of PUCCH resources can be allocated with respect to a single ARI value.

Table 12 shows an example of an ARI mapping table allocating required for the case in which the MS employing SORTD transmits an HARQ ACK/NACK signal through the PUCCH format 3 by using multiple antennas including two antennas. The BS may configure an ARI mapping table with PUCCH resources selected from among k number of PUCCH resource set $N=\{n_1, n_2, \ldots, n_k\}$.

TABLE 12

| ACK/NACK Resource Indicator | Selected ACK/NACK resources |
| --- | --- |
| 00 | First PUCCH resource set, $\{n_1, n_2\}$ |
| 01 | Second PUCCH resource set, $\{n_2, n_3\}$ |
| 10 | Third PUCCH resource set, $\{n_3, n_k\}$ |
| 11 | Fourth PUCCH resource set, $\{n_4, n_k\}$ |

As described above, Table 12 shows an example of an ARI mapping table for allocating two PUCCH resources. The ARI mapping table, which allocates resources required when the MS transmits an HARQ ACK/NACK signal through the PUCCH format 1b by applying SORTD, may be variously configured to satisfy an ARI mapping table creation method as described hereinafter with respect to k number of PUCCH resources (here, k≥4).

Like the case of Table 12, in the case in which SORTD using two antennas is applied, the BS may configure an ARI mapping table allocating PUCCH resources required for transmitting an HARQ ACK/NACK signal through the PUCCH format 3, with respect to each antenna.

The ARI mapping table of Table 12 may be shared by a BS and a plurality of MSs. Thus, in a case in which an ARI value allocating resources to the terminal $UE_m$ is 00, the terminal $UE_m$ may obtain PUCCH resources $\{n_1, n_2\}$. The terminal $UE_m$ may transmit the HARQ ACK/NACK signal through the PUCCH format 3 using the resource $n_1$ via one of two antennas constituting multiple antennas, and transmit the same HARQ ACK/NACK signal through the PUCCH format 3 using the resource $n_2$ via the other antenna.

In this case, the BS indicates 10 as an ARI value with respect to the terminal $UE_{m+1}$ employing SORTD so that the terminal $UE_m$ and $UE_{m+1}$ may obtain HARQ ACK/NACK PUCCH resources simultaneously by using the shared ARI mapping table.

Method for Configuring ARI Mapping Table

An ARI mapping table may be transferred to an MS through higher layer signaling such as RRC signaling. The BS may configure an ARI mapping table with PUCCH resources included in the PUCCH resource group N. Namely, a sub-PUCCH resource set (first to fourth PUCCH resource sets) indicated by each ARI value includes resources selected from among PUCCH resources constituting the PUCCH resource set N.

In the system to which the present invention is applied, the ARI mapping table may be configured to satisfy several requirements as follows.

(1) Presence of Independent Sub-PUCCH Resource Sets

An ARI mapping table is shared by a BS and a plurality of MSs. Thus, in order to simultaneously allocated resources to a plurality of MSs, one of sub-PUCCH resource sets (first to fourth PUCCH resource sets0 indicated by each ARI value includes PUCCH resources that does not belong to at least one sub-PUCCH resource set among the other remaining sub-PUCCH resource sets. Here, the sub-PUCCH resource sets including different PUCCH resources without a repeated element are referred to as being independent from each other.

(2) Number of MSs Supporting CA Environment

In a case in which the number of CCs set for MSs supporting a CA environment is large, a larger amount of codewords are transmitted via downlink. Thus, in order to transmit an HARQ ACK/NACK signal with respect to the corresponding codewords through channel selection, the number of PUCCH resources of a sub-PUCCH resource set indicated by each ARI is required to be increased. When the number M of HARQ ACK/NACK signals to be transmitted via a single symbol is determined according to the number of CCs used for downlink transmission and the number of transmitted codewords, the BS may determine the number of PUCCH resources of the sub-PUCCH resource sets constituting the ARI mapping table.

Also, in a case in which the number of MSs supporting a CA environment is large, it is required to increase the number of independent sub-PUCCH resource sets in the ARI mapping table. Thus, the BS determines a predetermined reference number, and when the number of MSs supporting a CA environment exceeds the predetermined reference number, the BS may increase the number of independent sub-PUCCH resource sets. For example, in a case in which the number of MSs supporting a CA environment is considerably large, the BS may configure four sub-PUCCH resource sets constituting the ARI mapping table such that they are independent from one another.

(3) Number of CCs and/or MSs in which MIMO Transmission Mode is Set

In a case in which the number of CCs or MSs in which an MIMO transmission mode is set is large, the BS may be required to increase the number of PUCCH resources of sub-PUCCH resource sets indicated by each ARI. When the number M of HARQ ACK/NACK signals to be transmitted in a single symbol is determined according to the number of CCs used for downlink transmission and the number of transmitted codewords, the BS may determine the number of PUCCH resources of sub-PUCCH resource sets constituting the ARI mapping table.

Also, in a case in which the number of MSs in which the MIMO transmission mode is set is large, the BS may increase the number of independent sub-PUCCH resource sets in the ARI mapping table. For example, the BS may determine a predetermined reference value, and when the number of MSs in which the MIMO transmission mode is set exceeds the predetermined reference value, the BS may increase the number of independent sub-PUCCH resource sets.

(4) Number of MSs to which SORTD is Applied

In a case in which SORTD is applied, as mentioned above, at least one or more PUCCH resources to be allocated by the BS are increased. Thus, in the case in which SORTD is applied, the BS may increase the number of PUCCH resources of the sub-PUCCH resource sets according to whether an HARQ ACK/NACK signal is transmitted through the PUCCH format 3, whether an HARQ ACK/NACK signal is transmitted through the PUCCH format 1b with channel selection, or whether channel selection is applied to all the antennas constituting multiple antennas if an HARQ ACK/NACK signal is transmitted through the PUCH format 1b with channel selection, and the like.

Also, in the case in which the number of MSs to which SORTD is applied is large, the BS may increase the number of independent sub-PUCCH resource sets in the ARI mapping table. For example, the BS may determine a predetermined reference value, and when the number of MSs to which an SORTD transmission mode is applied exceeds the predetermined reference value, the BS may increase the number of independent sub-PUCCH resource sets.

(5) Downlink Traffic of Current BS or System Load

The BS may configure an ARI mapping table according to downlink traffic or a system load. For example, in a case in which downlink traffic is increased, the BS may increase the number of independent sub-PUCCH resource sets in the ARI mapping table.

(6) Current Uplink Traffic of BS

The BS may configure an ARI mapping table according to uplink traffic. For example, in a case in which demand for uplink traffic is increased, the BS may increase the number of independent sub-PUCCH resource sets of the ARI mapping table. Also, the BS may adjust uplink transmission traffic by reducing the number of independent sub-PUCCH resource sets of the ARI mapping table.

Hereinafter, embodiments of the present invention according to the foregoing method for configuring an ARI mapping table will be described.

Table 13 to Table 15 are ARI mapping tables for allocating two PUCCH resources to an MS through an ARI. Table 13 to Table 15 are embodiments regarding a case in which two PUCCH resources are required, for example, a case in which an HARQ ACK/NACK signal is transmitted through the PUCCH format 1b with channel selection. It may be a case in which two PUCCH resources for configuring a channel selection table are allocated or a case in which two PUCCH resources are allocated to transmit an HARQ ACK/NACK signal through the PUCCH format 3 by applying SORTD.

Of course, the content described hereinafter according to the present embodiment may also be applied to the cases of Table 7 to Table 12.

Table 13 shows an example of an ARI mapping table configured such that at least one independent sub-PUCCH resource exists with respect to one sub-PUCCH resource set, by using four PUCCH resources $\{n_1, n_2, n_3, n_4\}$.

TABLE 13

| ACK/NACK Resource Indicator | Selected ACK/NACK resources |
|---|---|
| 00 | First PUCCH resource set, $\{n_1, n_3\}$ |
| 01 | Second PUCCH resource set, $\{n_2, n_4\}$ |
| 10 | Third PUCCH resource set, $\{n_1, n_4\}$ |
| 11 | Fourth PUCCH resource set, $\{n_2, n_3\}$ |

According to Table 13, in the case that an ARI value is 00 and in the case that the ARI vale is 01, or in the case that the ARI value is 10 and in the case that the ARI value is 11, resources may be simultaneously allocated to two different terminals.

As described above, in a case in which the number of MSs sharing the ARI mapping table is increased or in a case in which network traffic is increased, or the like, it is required to increase the number of independent sub-PUCCH resource sets in the ARI mapping table for an effective network operation. Table 14 shows an example of an ARI mapping table configured such that the number of independent sub-PUCCH resource sets is increased, relative to the case of Table 13.

TABLE 14

| ACK/NACK Resource Indicator | Selected ACK/NACK resources |
|---|---|
| 00 | First PUCCH resource set, $\{n_1, n_6\}$ |
| 01 | Second PUCCH resource set, $\{n_2, n_5\}$ |
| 10 | Third PUCCH resource set, $\{n_3, n_4\}$ |
| 11 | Fourth PUCCH resource set, $\{n_1, n_5\}$ |

Unlike the case of Table 13, in Table 14, PUCCH resources may be simultaneously allocated to three different terminals. For example, PUCCH resources required for different terminals may be simultaneously allocated by using an ARI having a value of 01 and an ARI having a value of 10.

Table 15 shows an example of an ARI mapping table configured such that the number of independent sub-PUCCH resource sets is further increased, with eight PUCCH resources $\{n_1, n_2, n_3, n_4, n_s, n_6, n_7, n_8\}$.

TABLE 15

| ACK/NACK Resource Indicator | Selected ACK/NACK resources |
|---|---|
| 00 | 제1 PUCCH resource set, $\{n_1, n_2\}$ |
| 01 | 제2 PUCCH resource set, $\{n_3, n_4\}$ |
| 10 | 제3 PUCCH resource set, $\{n_5, n_6\}$ |
| 11 | 제4 PUCCH resource set, $\{n_7, n_8\}$ |

Unlike the cases of Table 13 and Table 14, in Table 15, all the sub-PUCCH resource sets are independent from one another. Thus, in this case, the PUCCH resources of all the sub-PUCCH resource sets may be allocated to different terminals.

Here, it is described that an ARI mapping table in which one independent sub-PUCCH resource set exists with respect to one sub-PUCCH resource set is configured with four PUCCH resources, an ARI mapping table in which two independent sub-PUCCH resource sets exist with respect to one sub-PUCCH resource set is configured with six PUCCH resources, and an ARI mapping table in which four sub-PUCCH resource sets are independent is configured with eight PUCCH resources, but these are part of various embodiments of the present invention and the present invention is not limited thereto. For example, an ARI mapping table in which one independent sub-PUCCH resource set exists with respect to one sub-PUCCH resource set may be configured with six PUCCH resources, or an ARI mapping table in which four sub-PUCCH resource sets are independent may be configured with ten PUCCH resources.

Figure 8:
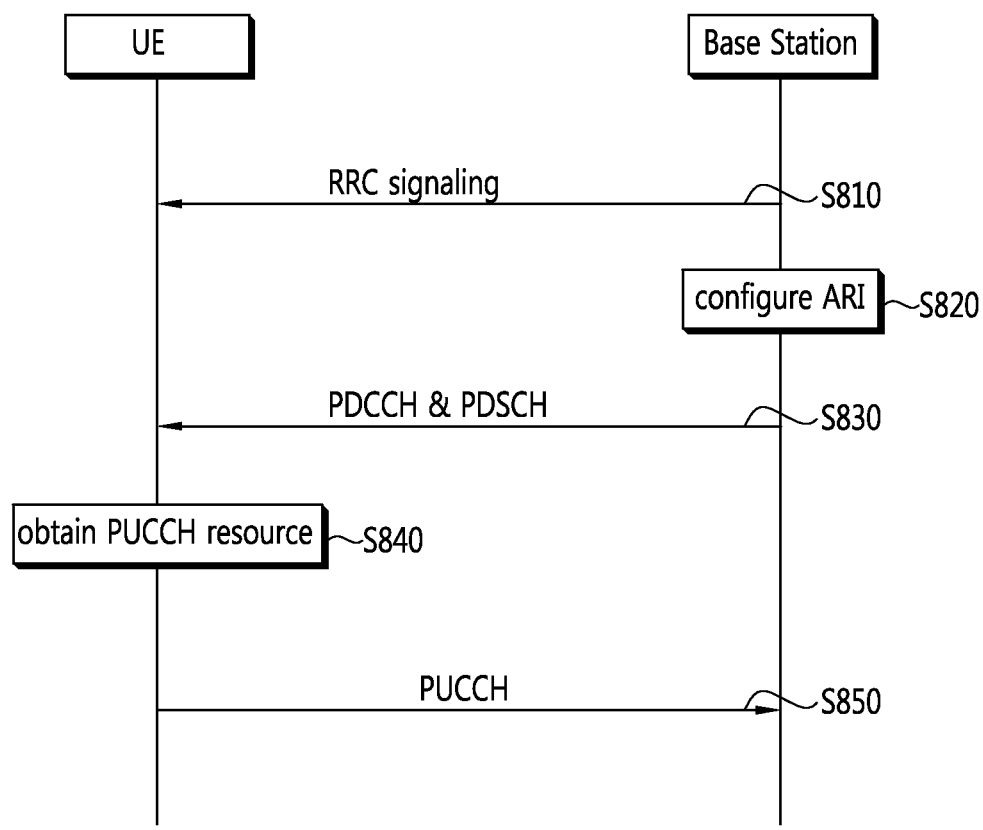
FIG. 8 is a flow chart schematically illustrating operations of a base station (BS) and a mobile station (MS) (or a user equipment (UE)) in a system to which the present invention is applied.

FIG. 8 is a flow chart schematically illustrating operations of a BS and an MS in a is system to which the present invention is applied.

A BS transmits information required for transmission of an HARQ ACK/NACK signal to an MS through higher layer signaling such as RRC signaling, or the like (S810). In this case, the information required for transmission of the HARQ ACK/NACK signal transmitted to the MS may include information regarding by using which PUCCH format an HARQ ACK/NACK signal is to be transmitted, e.g., whether the HARQ ACK/NACK signal is to be transmitted through the PUCCH format 3 or whether the HARQ ACK/NACK signal is to be transmitted through the PUCCH format 1b with channel selection. Also, in the case in which the HARQ ACK/NACK signal is determined to be transmitted through the PUCCH format 1b with channel selection, the information may include information regarding a channel selection table. Also, the information required for transmission of the HARQ ACK/NACK signal may include an indication whether to apply SORTD and may include an ARI mapping table for allocating PUCCH resources with an ARI. Also, higher layer signaling may be information indicating that a size k of a resource set used for transmission of a PUCCH is allocated to the MS. Here, the size k of the resource set may be variably allocated according to a format of the PUCCH within a maximum number of resources. For example, the size k may be defined as shown in Table 7 to Table 15.

As described above, an ARI mapping table may be configured in consideration of situations and requirements of various systems. For example, when the MS transmits an HARQ ACK/NACK signal through the PUCCH format 1b with channel selection, the ARI mapping table may be configured to allocate PUCCH resources for configuring a channel selection table. When the terminal transmits an HARQ ACK/NACK signal through the PUCCH format 3, the ARI mapping table may be configured to allocate PUCCH resources so that the MS can transmit an HARQ ACK/NACK signal through the PUCCH format 3. Also, the BS may configure the ARI mapping table in consideration of various situations such as whether SORTD is applied to the MS, traffic of uplink and downlink, the number of MSs, and the like. The ARI mapping table configured thusly is transmitted to a plurality of MSs so as to be shared by the BS and the MSs.

The BS configures an ARI indicating PUCCH resources to be allocated to the MS (S820). The ARI may be configured by diverting a 2-bit data region allocated to a TPC command on a PDCCH redundantly transmitted in each CC in a CA environment. Here, unlike the ARI mapping table shared by a plurality of MSs, the ARI may be configured to be UE-specific.

The BS transmits required information on a downlink control channel (PDCCH) and a downlink data transport channel (PDSCH) (S830). Since the ARI is transferred by diverting the TPC field as mentioned above, it may be transmitted on a PDCCH to the MS.

The MS obtains resources for transmitting an HARQ ACK/NACK signal according to the received ARI (S840). In a case in which the MS transmits the HARQ ACK/NACK signal through the PUCCH format 1b with channel selection, the MS may configure a channel selection table with the obtained PUCCH resources. Also, in a case in which the MS transmits the HARQ ACK/NACK signal through the PUCCH format 3, the MS may transmit the HARQ ACK/NACK signal through the PUCCH format 3 by using the obtained PUCCH resources.

The MS may transmit the HARQ ACK/NACK signal on a PUCCH by using the obtained PUCCH resources (S850). In the case in which the MS transmits the HARQ ACK/NACK signal through the PUCCH format 1b with channel selection, the MS may transmit symbols in the channel selection table corresponding to a type of the HARQ ACK/NACK signal to be transmitted, as corresponding PUCCH resources. Also, in the case in which the MS transmits the HARQ ACK/NACK signal through the PUCCH format 3, the MS may multiplex the HARQ ACK/NACK signal up to 10 bits in case of FDD and up to 20 bits in case of TDD and transmit the same.

Figure 9:
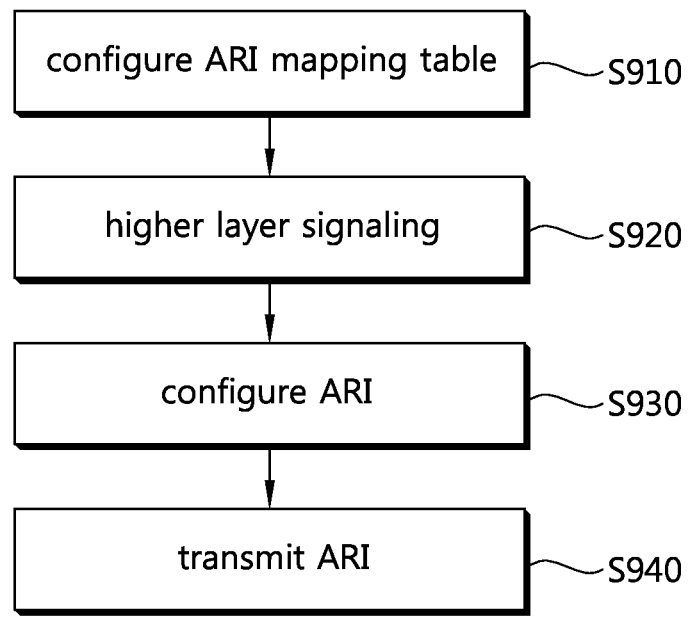
FIG. 9 is a flow chart schematically illustrating an operation of the BS in the system to which the present invention is applied.

FIG. 9 is a flow chart schematically illustrating an operation of the BS in the system to which the present invention is applied.

A BS configures an ARI mapping table to be used for resource allocation (S910). The ARI mapping table may be configured in consideration of an HARQ ACK/NACK signal transmission method of an MS. The HARQ ACK/NACK signal transmission method of the MS, e.g., whether to transmit the HARQ ACK/NACK signal through the PUCCH format 1b with channel selection or whether to transmit the HARQ ACK/NACK signal through the PUCCH format 3 may be determined in advance between the MS and the BS or may be transmitted to the MS through higher layer signaling.

Also, the BS may configure the ARI mapping table in consideration of various situations such as whether SORTD is applied to the MS, traffic of uplink and downlink, the number of MSs, and the like.

The BS transfers higher layer signaling to the MS (S920). The higher layer signaling includes information regarding the HARQ ACK/NACK signal transmission method of the MS, and information regarding an ARI mapping table configured according to the HARQ ACK/NACK signal transmission method of the MS. In the case in which the MS transmits the HARQ ACK/NACK signal through the PUCCH format 1b with channel selection, the higher layer signaling may include a format of a channel selection table, and when PUCCH resources are allocated through an ARI, a channel selection table may be configured by using the format of the channel selection table and the allocated PUCCH resources. The higher layer signaling may include information regarding as to whether SORTD is applied. An ARI mapping table transmitted through the higher layer signaling may be shared by the BS and a plurality of MSs.

The BS configures an ARI (S930). The ARI may be configured by diverting a 2-bit data region allocated to a TPC command on the PDCCH redundantly transmitted in each CC in a CA environment, and indicate PUCCH resources to be allocated for a specific MS.

The BS transmits the ARI to the MS (S940). The BS transmits the ARI on a PDCCH.

Figure 10:
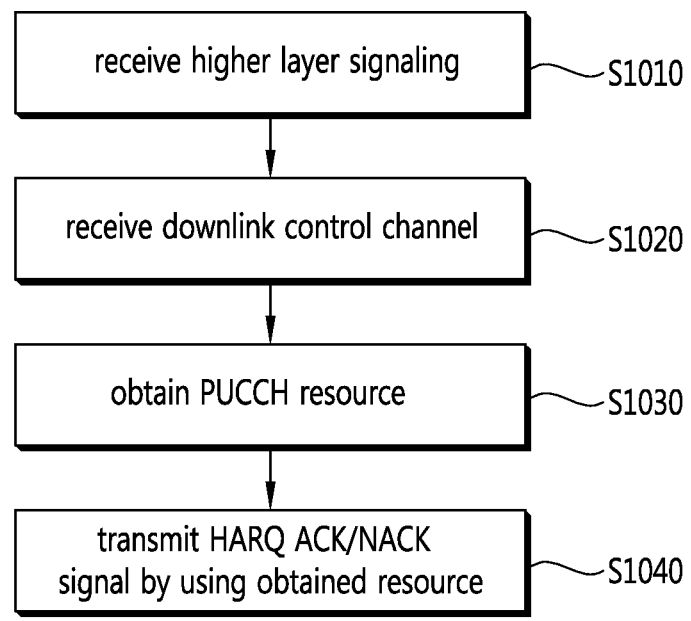
FIG. 10 is a flow chart schematically illustrating an operation of the MS in the system to which the present invention is applied.

FIG. 10 is a flow chart schematically illustrating an operation of the MS in the system to which the present invention is applied.

The MS receives higher layer signaling such as RRC signaling from the BS (S1010). The higher layer signaling may include information regarding an HARQ ACK/NACK signal transmission method of the MS, information regarding an ARI mapping table configured according to the HARQ ACK/NACK signal transmission method of the MS, information regarding a channel selection table, and/or information regarding whether SORTD is applied, and the like.

The MS receives information on a downlink control channel (S 1020). An ARI indicating PUCCH resources to be allocated to the MS in an ARI mapping table is transmitted by utilizing a data region to be allocated to a TPC field redundantly transmitted on the downlink control channel.

The MS obtains PUCCH resources indicated by the received ARI (S 1030). In the case in which the MS transmits the HARQ ACK/NACK signal through the PUCCH format 1b with channel selection, the MS may configure a channel selection table with the obtained PUCCH resources. Also, when the MS transmits the HARQ ACK/NACK signal through the PUCCH format 3, the MS may transmit the HARQ ACK/NACK signal through the PUCCH format 3 by using the obtained PUCCH resources.

The MS transmits the HARQ ACK/NACK signal by using the received PUCCH resources (S 1040). For example, in a case in which the MS transmits the HARQ ACK/NACK signal through the PUCCH format 1b with channel selection, the MS may transmit symbols in the channel selection table corresponding to a type of the HARQ ACK/NACK signal to be transmitted, as PUCCH resources. Also, in a case in which the MS transmits the HARQ ACK/NACK signal through the PUCCH format 3, the MS may multiplex the HARQ ACK/NACK signal up to 10 bits in case of FDD and multiplex the HARQ ACK/NACK signal up to 20 bits in case of TDD, and transmit the same.

Figure 11:
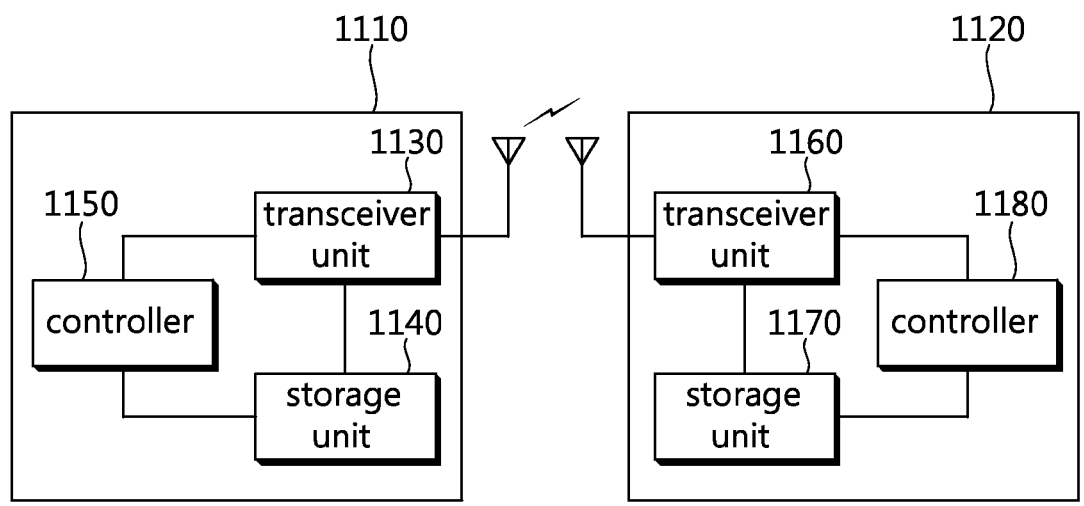
FIG. 11 is a view schematically illustrating a configuration of an example of a system to which the present invention is applied.

FIG. 11 is a view schematically illustrating a configuration of an example of a system to which the present invention is applied.

An MS 1110 may include a transceiver unit 1130, a storage unit 1140, and a controller 1150. A BS 1120 may include a transceiver unit 1160, a storage unit 1170, and a controller 1180.

The MS 1110 transmits and receives required information via the transceiver unit 1130. For example, the transceiver unit 1130 receives higher layer signaling allocating a size k of a resource set used for transmission of physical uplink control channel (PUCCH) to the MS from the BSS, receives a physical downlink control channel (PDCCH) including transport power control (TPC) information explicitly indicating specific resources in the resource set and at least one physical downlink shared channel (PDSCH) from the BS through at least one downlink CC, and transmits an HARQ ACK/NACK signal with respect to the at least one physical downlink shared channel to the BS. Here, the size k may be variably allocated according to a format of the physical uplink control channel within a maximum number of resources that can be allocated to the MS. For example, the size k may be defined as shown in Table 7 to Table 15.

The storage unit 1140 stores required information to allow the MS 1110 to perform wireless communication in a network. The storage unit 1140 may store higher layer signaling, e.g., information regarding an HARQ ACK/NACK transmission method, a channel selection table, an ARI mapping table, and the like.

The controller 1150 may be connected to the transceiver unit 1130 and the storage unit 1140 and control them. The controller 1150 configures an HARQ ACK/NACK signal according to a determined HARQ ACK/NACK signal transmission method, and transmits the configured HARQ ACK/NACK signal to the BS 1120 via the transceiver unit 1130. For example, the controller 1150 performs an operation for transmitting the HARQ ACK/NACK signal according to a determined method such as a method for transmitting an HARQ ACK/NACK signal through the PUCCH format 1b with channel selection, a method for transmitting an HARQ ACK/NACK signal through the PUCCH format 3, and the like. Also, in a case in which SORTD is determined in advance to be applied, or in a case in which there is an instruction from the BS, the controller 1150 performs an operation for transmitting the HARQ ACK/NACK signal accordingly. Also, the controller 1150 obtains PUCCH resources indicated by an ARI received via the transceiver unit 1130 by using an ARI mapping table stored in the storage unit 1140, and provides control to configure a channel selection table or map the HARQ ACK/NACK signal to the specific resources by using the PUCCH resources.

The BS 1120 may transmit or receive required information via the transceiver unit 1160.

The storage unit 1170 stores required information to allow the BS 1120 to perform wireless communication in a network. For example, the storage unit 1170 may store information regarding an ARI mapping table transmitted to the MS, a channel selection table used by the MS, and the like.

The controller 1180 may be connected to the transceiver unit 1160 and the storage unit 1170 and control them. The controller 1180 may configure an ARI mapping table in consideration of an HARQ ACK/NACK signal transmission method of the MS, a communication environment, and the like, and transmit the configured ARI mapping table to the MS 1110 via the transceiver unit 1160. Also, the controller 1180 may configure an ARI indicating PUCCH resources to be allocated to the MS 1110. The controller 1180 may transfer the ARI to the MS 1110 by utilizing a data region to be allocated to a TPC field redundantly transmitted through a multi-component carrier.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

While the present invention has been shown and described in connection with the embodiments, it will be apparent to those skilled in the art that modifications and variations can be made without departing from the spirit and scope of the invention as defined by the appended claims. Thus, the present invention is not limited to the foregoing embodiments and may include all the embodiments within the scope of the appended claims.

The invention claimed is:

1. A resource allocation method comprising:
   receiving higher layer signaling allocating a size k of resource sets used for transmission of a physical uplink control channel (PUCCH) to a mobile station (MS), from a base station (BS);
   receiving a physical downlink control channel (PDCCH) including transmission power control (TPC) information explicitly indicating a specific resource and at least one physical downlink shared channel (PDSCH) in the resource sets from the BS through at least one downlink component carrier; and mapping a Hybrid Automatic Repeat reQuest Acknowlegement/Not-Acknowlegement (HARQ ACK/NACK) signal with respect to the at least one physical downlink shared channel (PDSCH) to the specific resource and transmitting the same to the BS, wherein the size k is variably allocated according to a format of the physical uplink control channel (PUCCH) within a maximum number of resources that are allocated to the MS, and k is an integer greater than zero.

2. The resource allocation method of claim 1, wherein a format of the physical uplink control channel is format 3.

3. The resource allocation method of claim 1, wherein the at least one downlink component carrier includes a primary component carrier (PCC) and a secondary component carrier (SCC), and the HARQ ACK/NACK signal is defined by channel selection configuring an HARQ ACK/NACK signal by mapping the resource to a combination of a first HARQ ACK/NACK symbol with respect to a physical downlink shared channel of the PCC and a second HARQ ACK/NACK symbol with respect to a physical downlink shared channel of the SCC.

4. The resource allocation method of claim 1, wherein the MS has a plurality of transmission antennas, and the HARQ ACK/NACK signal is transmitted through first resource allocated to a first transmission antenna and second resource allocated to a second transmission antenna among the resource sets.

5. The resource allocation method of claim 4, wherein the HARQ ACK/NACK signal is transmitted through the first resource and the second resource based on a SORTD (Spatial Orthogonal Resource Transmit Diversity) scheme.

6. The resource allocation method of claim 1, wherein k is equal to or smaller than 8.

7. A resource allocation method comprising:
transmitting higher layer signaling allocating a size k of resource sets used for transmission of a physical uplink control channel (PUCCH) to a mobile station (MS), to the MS;

transmitting a physical downlink control channel (PDCCH) including transmission power control (TPC) information explicitly indicating a specific resource and at least one physical downlink shared channel (PDSCH) in the resource sets to the MS through at least one downlink component carrier; and receiving a Hybrid Automatic Repeat reQuest Acknowlegement/Not-Acknowlegement (HARQ ACK/NACK) signal with respect to the at least one physical downlink shared channel (PDSCH) mapped to the specific resource from the MS, wherein the size k is variably allocated according to a format of the physical uplink control channel (PUCCH) within a maximum number of resources that are allocated to the MS, and k is an integer greater than zero.

8. The resource allocation method of claim 7, wherein a format of the physical uplink control channel is format 3.

9. The resource allocation method of claim 7, wherein the at least one downlink component carrier includes a primary component carrier (PCC) and a secondary component carrier (SCC), and the HARQ ACK/NACK signal is defined by channel selection which configures an HARQ ACK/NACK signal by mapping the resource to a combination of a first HARQ ACK/NACK symbol with respect to a physical downlink shared channel of the PCC and a second HARQ ACK/NACK symbol with respect to a physical downlink shared channel of the SCC.

10. The resource allocation method of claim 7, wherein the MS has a plurality of transmission antennas, and the HARQ ACK/NACK signal is received through first resource allocated to a first transmission antenna and second resource allocated to a second transmission antenna among the resource sets.

11. The resource allocation method of claim 10, wherein the HARQ ACK/NACK signal is received through the first resource and the second resource based on a SORTD (Spatial Orthogonal Resource Transmit Diversity) scheme.

12. The resource allocation method of claim 7, wherein k is equal to or smaller than 8.

13. A mobile station (MS) comprising:
a transceiver configured to receive higher layer signaling allocating a size k of resource sets used for transmission of a physical uplink control channel (PUCCH) to a mobile station (MS), from a base station (BS), to receive a physical downlink control channel (PDCCH) including transmission power control (TPC) information explicitly indicating a specific resource and at least one physical downlink shared channel (PDSCH) in the resource sets from the BS through at least one downlink component carrier; and to transmit a Hybrid Automatic Repeat reQuest Acknowlegement/Not-Acknowlegement (HARQ ACK/NACK) signal with respect to the at least one physical downlink shared channel (PDSCH) to the BS;

a storage configured to store information associated with the higher layer signaling; and a controller configured to provide control to map the HARQ ACK/NACK signal to the specific resource, wherein the size k is variably allocated according to a format of the physical uplink control channel (PUCCH) within a maximum number of resources that are allocated to the MS, and k is an integer greater than zero.

14. The mobile station of claim 13, wherein the at least one downlink component carrier includes a primary component carrier (PCC) and a secondary component carrier (SCC), the controller defines the HARQ ACK/NACK signal by channel selection, and the channel selection configures an HARQ ACK/NACK signal by mapping the resource to a combination of a first HARQ ACK/NACK symbol with respect to a physical downlink shared channel of the PCC and a second HARQ ACK/NACK symbol with respect to a physical downlink shared channel of the SCC.

15. The mobile station of claim 13, wherein the MS has a plurality of transmission antennas, and the transceiver unit transmits the HARQ ACK/NACK signal through first resource allocated to a first transmission antenna and second resource allocated to a second transmission antenna among the resource sets.

16. The mobile station of claim 15, wherein the transceiver unit transmits the HARQ ACK/NACK signal through the first resource and the second resource based on a SORTD (Spatial Orthogonal Resource Transmit Diversity) scheme.

17. The mobile station of claim 13, wherein k is equal to or smaller than 8.

18. The mobile station of claim 13, wherein a format of the physical uplink control channel is format 3.

* * * * *